US012573096B2

(12) United States Patent
Park et al.

(10) Patent No.: US 12,573,096 B2
(45) Date of Patent: Mar. 10, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Yousun Park, Seoul (KR); Hyejung Hur, Seoul (KR); Sejin Oh, Seoul (KR); Donggyu Sim, Seoul (KR); Jongseok Lee, Seoul (KR); Joohyung Byeon, Seoul (KR)

(73) Assignee: LG Electronics, Inc., Seoul (KR)

( * ) Notice: Subject to any disclaimer, the term of this patent is extended or adjusted under 35 U.S.C. 154(b) by 663 days.

(21) Appl. No.: 17/642,412

(22) PCT Filed: Jul. 28, 2020

(86) PCT No.: PCT/KR2020/009913
§ 371 (c)(1),
(2) Date: Mar. 11, 2022

(87) PCT Pub. No.: WO2021/049758
PCT Pub. Date: Mar. 18, 2021

(65) Prior Publication Data
US 2022/0343548 A1      Oct. 27, 2022

Related U.S. Application Data

(60) Provisional application No. 62/899,128, filed on Sep. 11, 2019.

(51) Int. Cl.
*G06T 9/00* (2006.01)
*G06T 9/40* (2006.01)
*H04N 19/184* (2014.01)

(52) U.S. Cl.
CPC ................. *G06T 9/001* (2013.01); *G06T 9/40* (2013.01)

(58) Field of Classification Search
CPC ........... G06T 9/001; G06T 9/40; G06T 9/004; H04N 19/124; H04N 19/184; H04N 21/2343; H04N 21/4402
USPC ......................................................... 382/232
See application file for complete search history.

(56) References Cited

U.S. PATENT DOCUMENTS

| | | | |
|---|---|---|---|
| 2019/0080483 A1* | 3/2019 | Mammou | ............. G06T 3/4007 |
| 2019/0081638 A1 | 3/2019 | Mammou et al. | |
| 2022/0292723 A1* | 9/2022 | Wan | .................... H04N 19/597 |

OTHER PUBLICATIONS

Mammou et al, "G-PCC codec description v2," International Organisation for Standardisation, Coding of Moving Pictures and Audio, Jan. 2019, 39 pages (Year: 2019).*

(Continued)

*Primary Examiner* — Charlotte M Baker
*Assistant Examiner* — Dustin Bilodeau
(74) *Attorney, Agent, or Firm* — Fish & Richardson P.C.

(57) ABSTRACT

A point cloud data reception method according to embodiments can comprise the steps of: receiving a bitstream including point cloud data; and decoding the point cloud data. A point cloud data transmission method according to embodiments can comprise the steps of: encoding point cloud data; and transmitting a bitstream including the point cloud data.

20 Claims, 33 Drawing Sheets

(56) References Cited

OTHER PUBLICATIONS

International Search Report and Written Opinion in International Appln. No. PCT /KR2020/009913, dated Nov. 24, 2020, 17 pages (with English translation).

Lopes et al., 'Adaptive Plane Projection for Video-based Point Cloud Coding,' Thesis for the degree of Master of Science in Electrical and Computer Engineering, Tecnico Lisboa, Nov. 2018, 114 pages.

Mammou et al, "G-PCC codec description v2," International Organisation for Standardisation, Coding of Moving Pictures and Audio, Jan. 2019, 39 pages.

Schwarz et al., "Emerging MPEG standards for point cloud compression," IEEE Journal on Emerging and Selected Topics in Circuits and Systems, Dec. 2018, 9(1):133-148.

* cited by examiner

FIG. 3
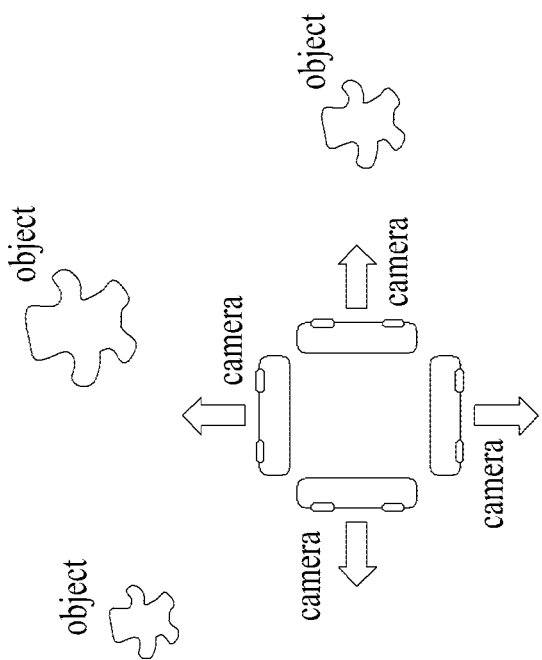
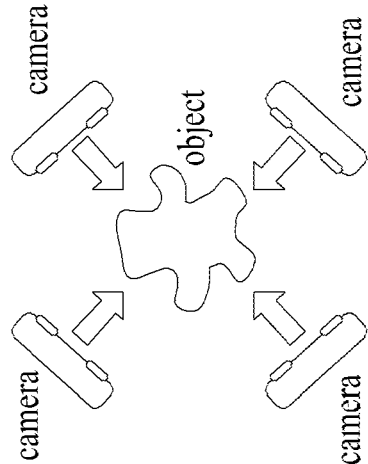

FIG. 7
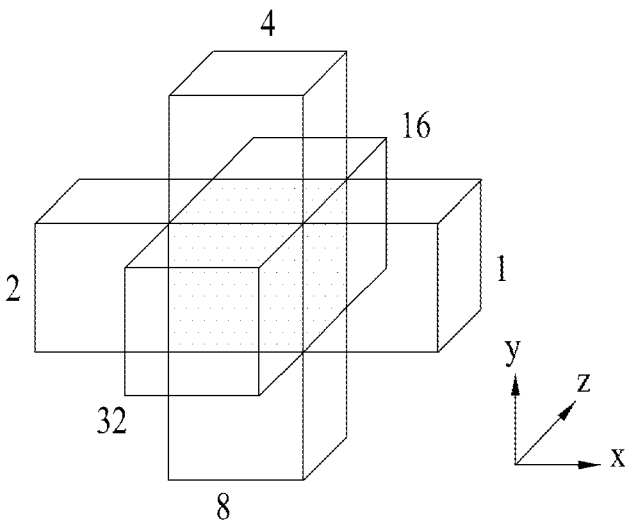
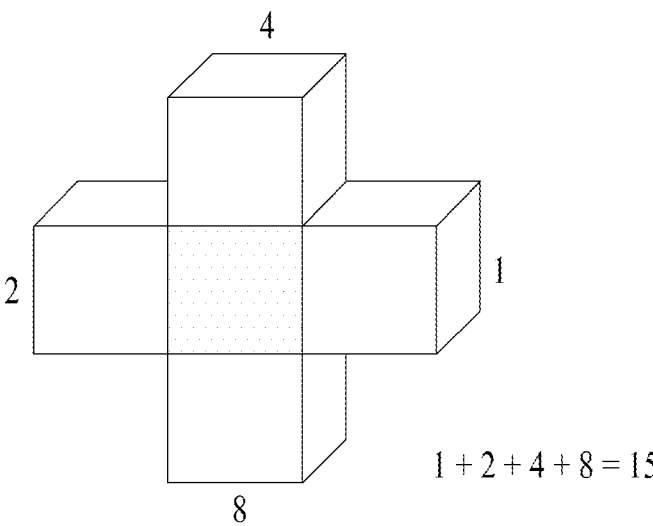
$$1 + 2 + 4 + 8 = 15$$

Level of details

FIG. 16

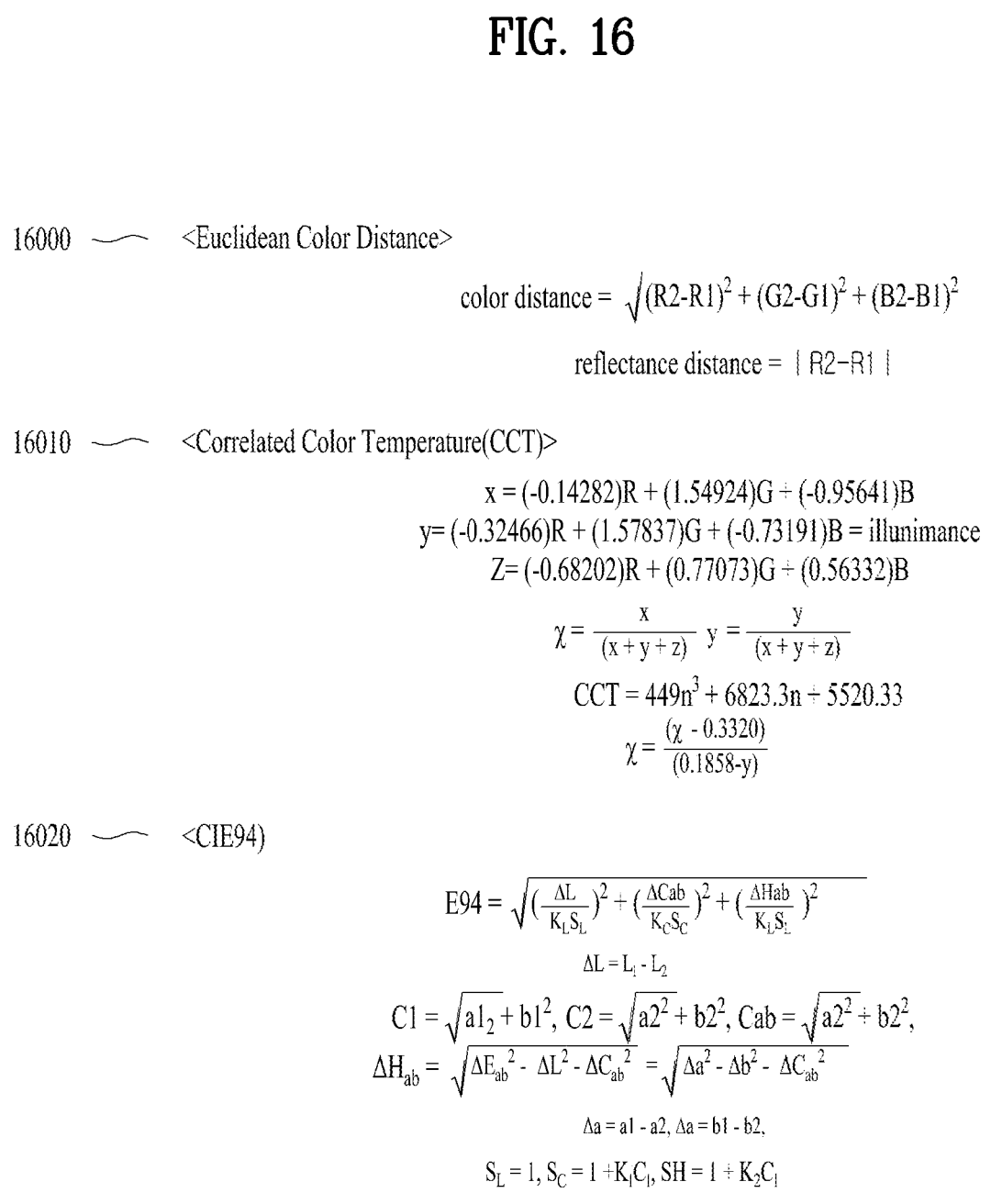

16000 ⌒ \<Euclidean Color Distance\>

$$\text{color distance} = \sqrt{(R2\text{-}R1)^2 + (G2\text{-}G1)^2 + (B2\text{-}B1)^2}$$

$$\text{reflectance distance} = |\,R2\text{-}R1\,|$$

16010 ⌒ \<Correlated Color Temperature(CCT)\>

$$x = (\text{-}0.14282)R + (1.54924)G + (\text{-}0.95641)B$$
$$y = (\text{-}0.32466)R + (1.57837)G + (\text{-}0.73191)B = \text{illunimance}$$
$$Z = (\text{-}0.68202)R + (0.77073)G + (0.56332)B$$

$$\chi = \frac{x}{(x+y+z)} \quad y = \frac{y}{(x+y+z)}$$

$$CCT = 449n^3 + 6823.3n + 5520.33$$

$$\chi = \frac{(\chi - 0.3320)}{(0.1858\text{-}y)}$$

16020 ⌒ \<CIE94)

$$E94 = \sqrt{\left(\frac{\Delta L}{K_L S_L}\right)^2 + \left(\frac{\Delta Cab}{K_C S_C}\right)^2 + \left(\frac{\Delta Hab}{K_L S_L}\right)^2}$$

$$\Delta L = L_1 - L_2$$

$$C1 = \sqrt{a1_2 + b1^2}, \; C2 = \sqrt{a2^2 + b2^2}, \; Cab = \sqrt{a2^2 + b2^2},$$

$$\Delta H_{ab} = \sqrt{\Delta E_{ab}^2 - \Delta L^2 - \Delta C_{ab}^2} = \sqrt{\Delta a^2 - \Delta b^2 - \Delta C_{ab}^2}$$

$$\Delta a = a1 - a2, \; \Delta a = b1 - b2,$$

$$S_L = 1, \; S_C = 1 + K_1 C_1, \; SH = 1 + K_2 C_1$$

① Searching for point having MC valuie greater than $P_x$mc in the direction of →

$P_i$ = point havingMC value closest to $P_x$mc

② Registering X (e.g., 3) points having the highest similarity to $P_x$ among the points in the range as neighbor point set of $P_x$ Sorted in Morton code order

18000

18020

18010

When search range level is 3, a maximum of $8^3$ points are the neighbor search range.

When search range level is 1, a maximum of $8^1$ points are the neighbor search range.

leaf node (lodIdex=0)

Search range according to search range level

FIG. 19

| Index difference | 1 | 2 | 3 | 4 | 5 | 6 | 7 | 8 | ... |
|---|---|---|---|---|---|---|---|---|---|
| Sig_fiag | 1 | 1 | 1 | 1 | 1 | 1 | 1 | 1 | ... |
| gt1_flag | 0 | 1 | 1 | 1 | 1 | 1 | 1 | 1 | ... |
| parity_flag | - | 0 | 1 | 0 | 1 | 0 | 1 | 0 | ... |
| gt3_flat | - | 0 | 0 | 1 | 1 | 1 | 1 | 1 | ... |
| remain_data (Golomb-Race) | - | - | - | 0 | 0 | 1 | 1 | 2 | ... |
| total bits | 2 | 4 | 4 | 5 | 5 | 5 | 5 | 5 | ... |

| attribute_parameter_set( ) { | Descriptor |
|---|---|
| aps_attr_parameter_set_id | ue(v) |
| aps_seq_parameter_set_id | ue(v) |
| attr_coding_type | ue(v) |
| isLifting = (attr_coding_type == 0 \|\| attr_coding_type == 2) ? 1 : 0 | |
| if( isLifting ) { | |
|   num_pred_nearest_neighbours | ue(v) |
|   neighbour_search_range_type | ue(v) |
|   neighbour_selection_type | ue(v) |
|   neighbour_search_range_rate_per_lod | ue(v) |
|   if( neighbour_selection_type > 1 ) { | |
|     neighbour_attr_different_method | ue(v) |
|     neighbour_attr_min_similarity_threshold | ue(v) |
|   } | |
|   if (neighbour_selection_type == 3) { | |
|     neighbour_attr_1st_phase_num_of_points | ue(v) |
|   } | |
|   sig_flag | u(1) |
|   gt1_flag | u(1) |
|   parity_flag | u(1) |
|   gt3_flag | u(1) |
|   remain_data | ue(v) |
|   max_num_direct_predictors | ue(v) |
|   lifting_search_range | ue(v) |
|   lifting_quant_step_size | ue(v) |
|   lifting_quant_step_size_chroma | ue(v) |
|   lod_binary_tree_enabled_flag | u(1) |
|   num_detail_levels_minus1 | ue(v) |
|   for( idx = 0; idx <= num_detail_levels_minus1; idx++ ) { | |
|     sampling_distance_squared[ idx ] | ue(v) |
|     neighbour_search_range[idx] | ue(v) |
|   } | |
| } | |

| | |
|---|---|
| if( attr_coding_type == 0 ) //PredictingLifting | |
|   adaptive_prediction_threshold | ue(v) |
| } | |
| if( attribute_coding_type == 1 ) { //RAHT | |
|   raht_depth | ue(v) |
|   raht_quant_step_size | ue(v) |
|   raht_quant_step_size_chroma | ue(v) |
| } | |
| aps_extension_present_flag | u(1) |
| if( aps_extension_present_flag ) | |
|   while( more_data_in_byte_stream( ) ) | |
|     aps_extension_data_flag | u(1) |
| byte_alignment( ) | |
| } | |

FIG. 26

| tile_parameter_set( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_scale_factor[ i ] | ue(v) |
| tile_bounding_box_size_width[ i ] | ue(v) |
| tile_bounding_box_size_height[ i ] | ue(v) |
| neighbour_search_range_type | ue(v) |
| neighbour_selection_type | ue(v) |
| neighbour_search_range_rate_per_lod | ue(v) |
| if (neighbour_selection_type > 1) { | |
| neighbour_attr_different_method | ue(v) |
| neighbour_attr_min_similarity_threshold | ue(v) |
| } | |
| if (neighbour_selection_type == 3) { | |
| neighbour_attr_1st_phase_num_of_points | ue(v) |
| } | |
| for( idx = 0; idx <= num_detail_levels_minus1; idx++ ) { | |
| neighbour_search_range[idx] | ue(v) |
| } | |
| sig_flag | u(1) |
| gt1_flag | u(1) |
| partity_flag | u(1) |
| gt3_flag | u(1) |
| remain_data | ue(v) |
| } | |
| byte_alignment( ) | |
| } | |

FIG. 27

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| neighbour_search_range_type | ue(v) |
| neighbour_selection_type | ue(v) |
| neighbour_search_range_rate_per_lod | ue(v) |
| if (neighbour_selection_type > 1) { | |
| neighbour_attr_different_method | ue(v) |
| neighbour_attr_min_similarity_threshold | ue(v) |
| } | |
| if (neighbour_selection_type == 3) { | |
| neighbour_attr_1st_phase_num_of_points | ue(v) |
| } | |
| for( idx = 0; idx <= num_detail_levels_minus1; idx++ ) { | |
| neighbour_search_range[idx] | ue(v) |
| } | |
| sig_flag | u(1) |
| gt1_flag | u(1) |
| partity_flag | u(1) |
| gt3_flag | u(1) |
| remain_data | ue(v) |
| byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Stage application under 35 U.S.C. § 371 of International Application No. PCT/KR2020/009913 which has an international filing date of Jul. 28, 2020, which claims the benefit of U.S. Provisional Application No. 62/899,128, filed Sep. 11, 2019. The disclosures of these prior applications are herein incorporated by reference in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide an apparatus and method for efficiently processing point cloud data. Embodiments provide a point cloud data processing method and apparatus for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method of receiving point cloud data may include receiving a bitstream containing the point cloud data, and decoding the point cloud data.

In another aspect of the present disclosure, a method of transmitting point cloud data may include encoding the point cloud data, and transmitting a bitstream containing the point cloud data.

Advantageous Effects

Apparatuses and methods according to embodiments may process point cloud data with high efficiency.

The apparatuses and methods according to the embodiments may provide a high-quality point cloud service.

The apparatuses and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 3 illustrates an exemplary process of capturing a point cloud video according to embodiments;

FIG. 7 shows an example of a neighbor node pattern according to embodiments;

FIG. 16 shows equations related to an attribute similarity measurement method according to embodiments;

FIG. 19 shows a prediction candidate list index of a selected candidate according to embodiments;

Figure 22:
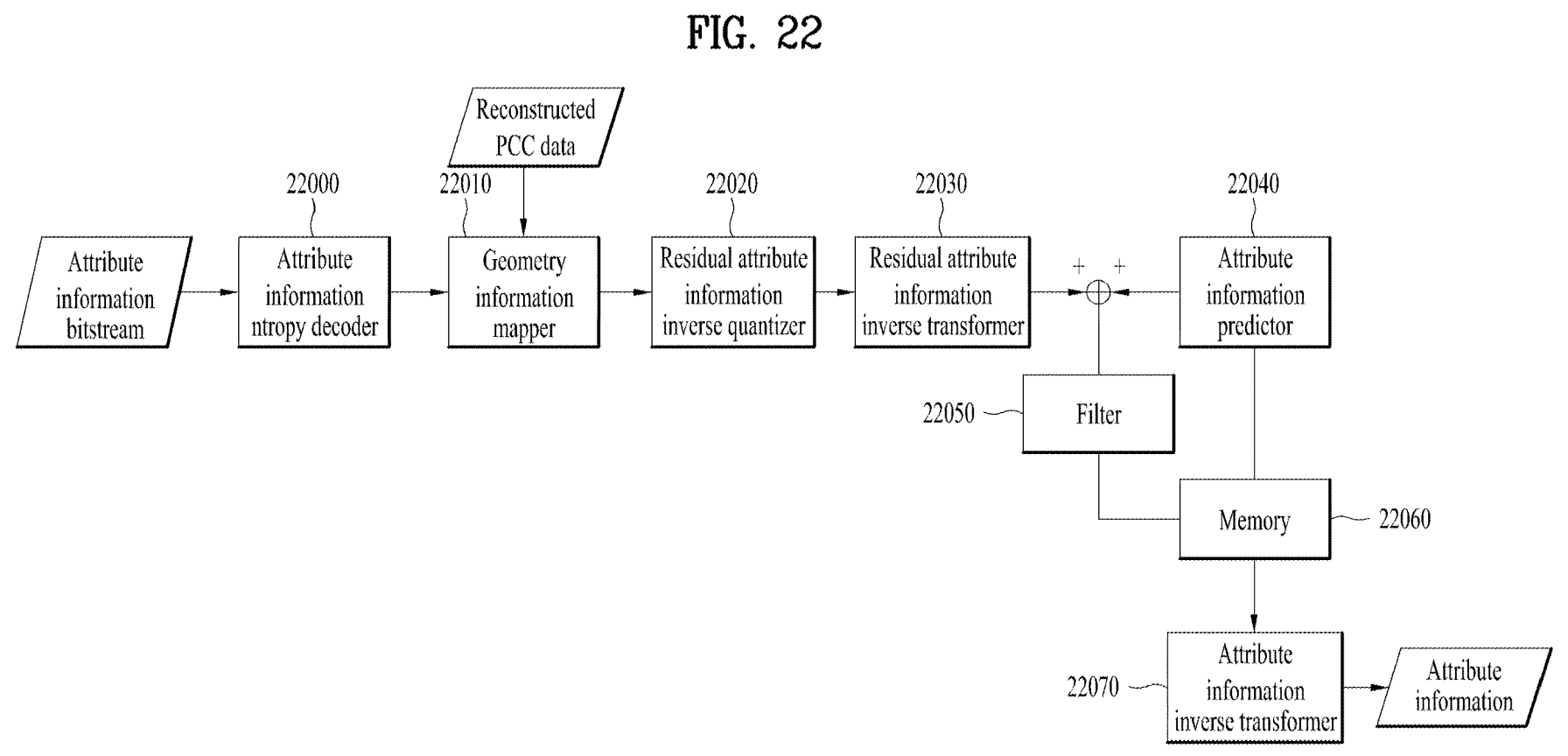

FIG. 22 shows an attribute information decoding unit according to embodiments;

FIG. 25 shows an attribute parameter set (APS) (attrib-ute_parameter_set) according to embodiments;

FIG. 26 shows a tile parameter set (TPS) (tile_parameter_set) according to embodiments;

FIG. 27 shows an attribute slice header (ASH) (attri-bute_slice_header) according to embodiments;

Figure 29:
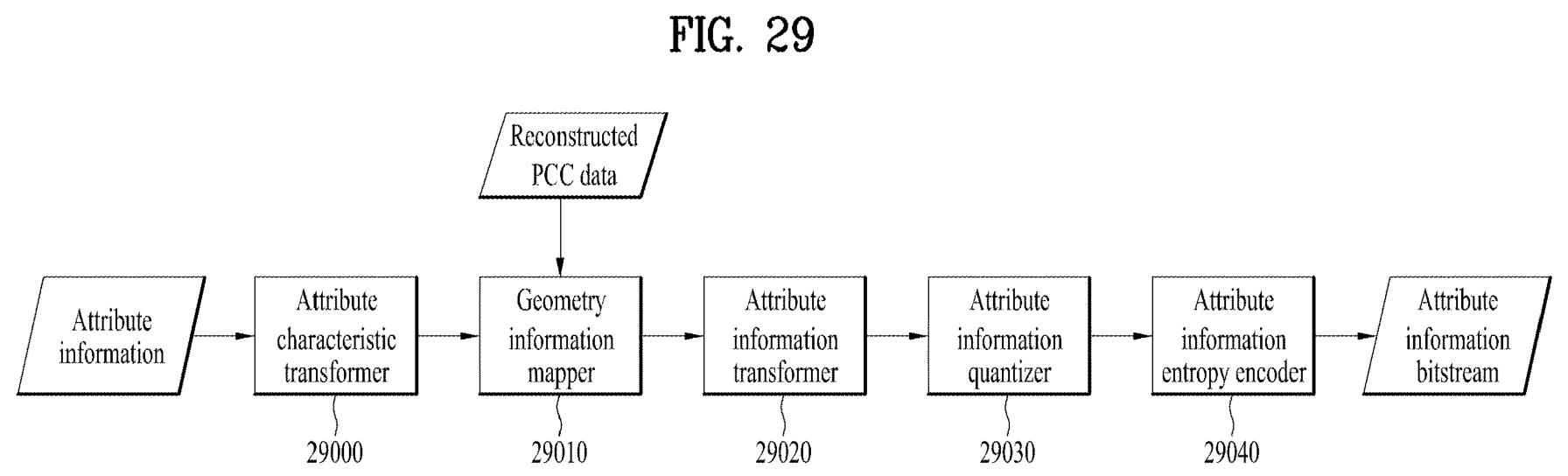

FIG. 29 shows an attribute information encoder according to embodiments;

Figure 31:
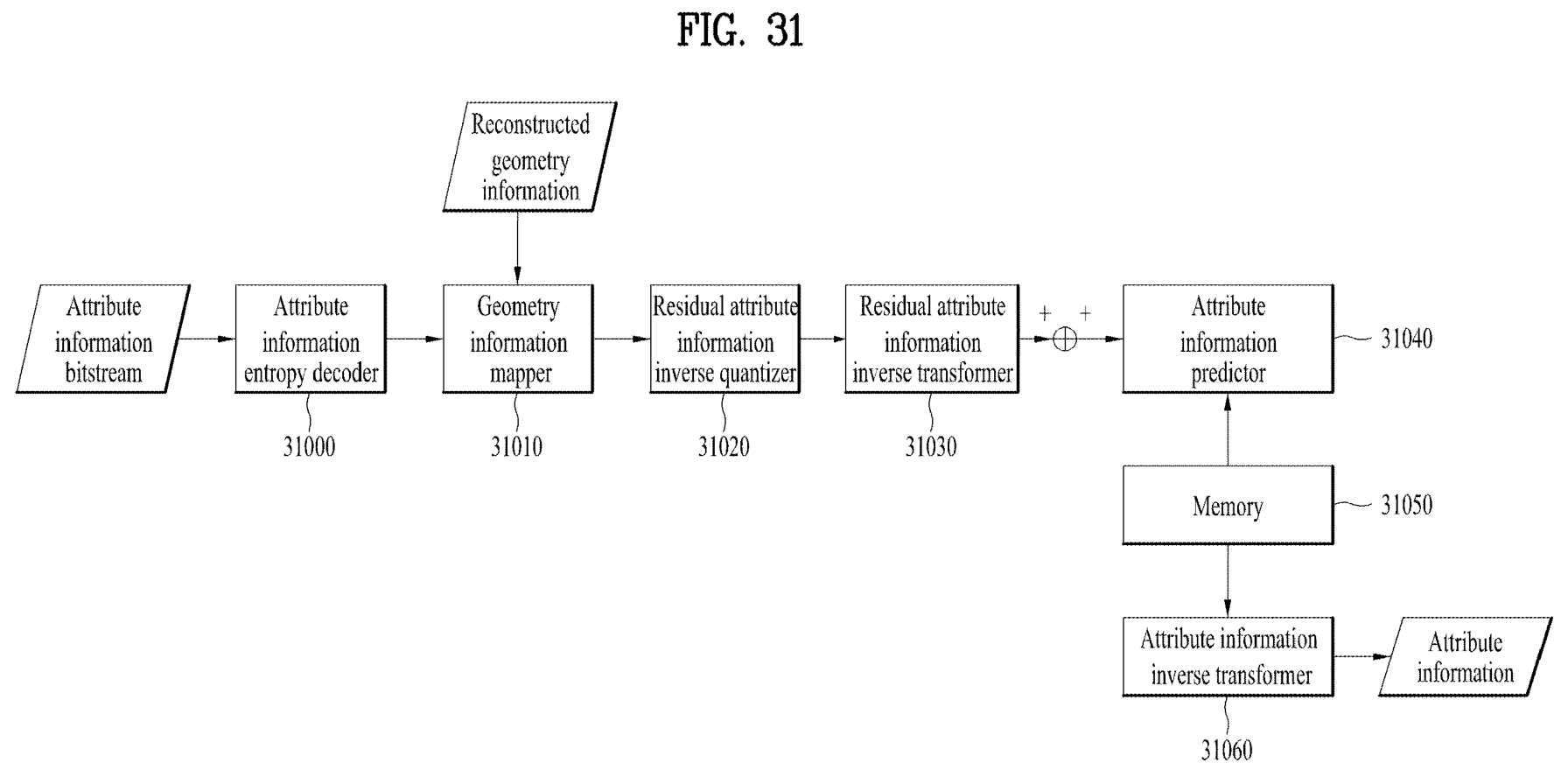

FIG. 31 shows an attribute information decoder according to embodiments;

BEST MODEL

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
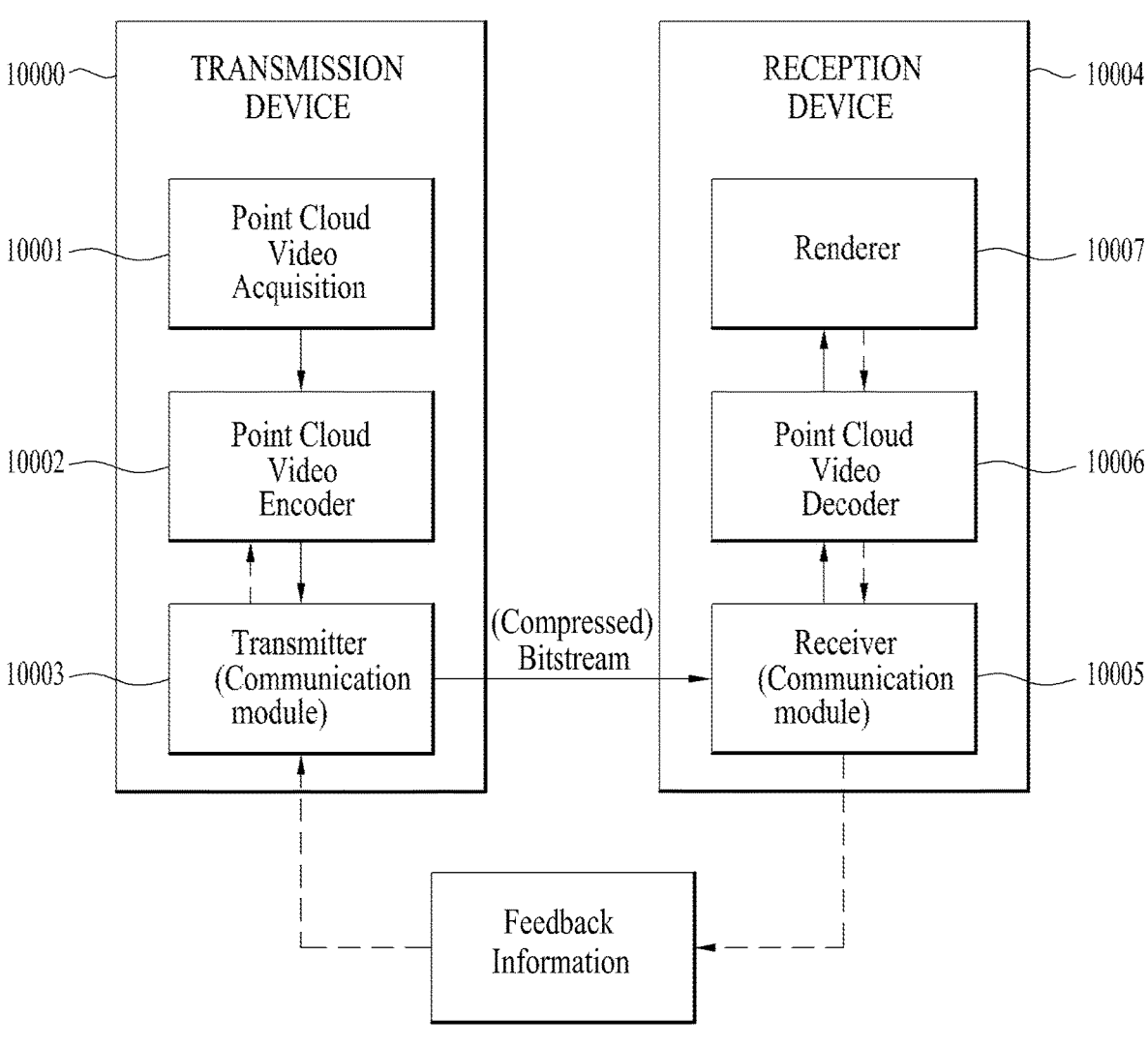
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodi-ments includes a point cloud video acquirer 10001, a point cloud video encoder 10002, and/or a transmitter (or com-munication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud com-pression (G-PCC) coding and/or video-based point cloud compression (V-PCC) coding or next-generation coding. The point cloud compression coding according to the embodiments is not limited to the above-described embodi-ment. The point cloud video encoder 10002 may output a bitstream containing the encoded point cloud video data. The bitstream may contain not only the encoded point cloud video data, but also signaling information related to encod-ing of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodi-ments, the file or segment may be transmitted to the recep-tion device 10004 over a network, or stored in a digital storage medium (e.g., USB, SD, CD, DVD, Blu-ray, HDD, SSD, etc.). The transmitter 10003 according to the embodi-ments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may trans-mit the encapsulated data in an on-demand manner.

The reception device 10004 according to the embodi-ments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/ segment and output a bitstream. According to embodiments, the receiver 10005 may include a decapsulator (or a decap-sulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
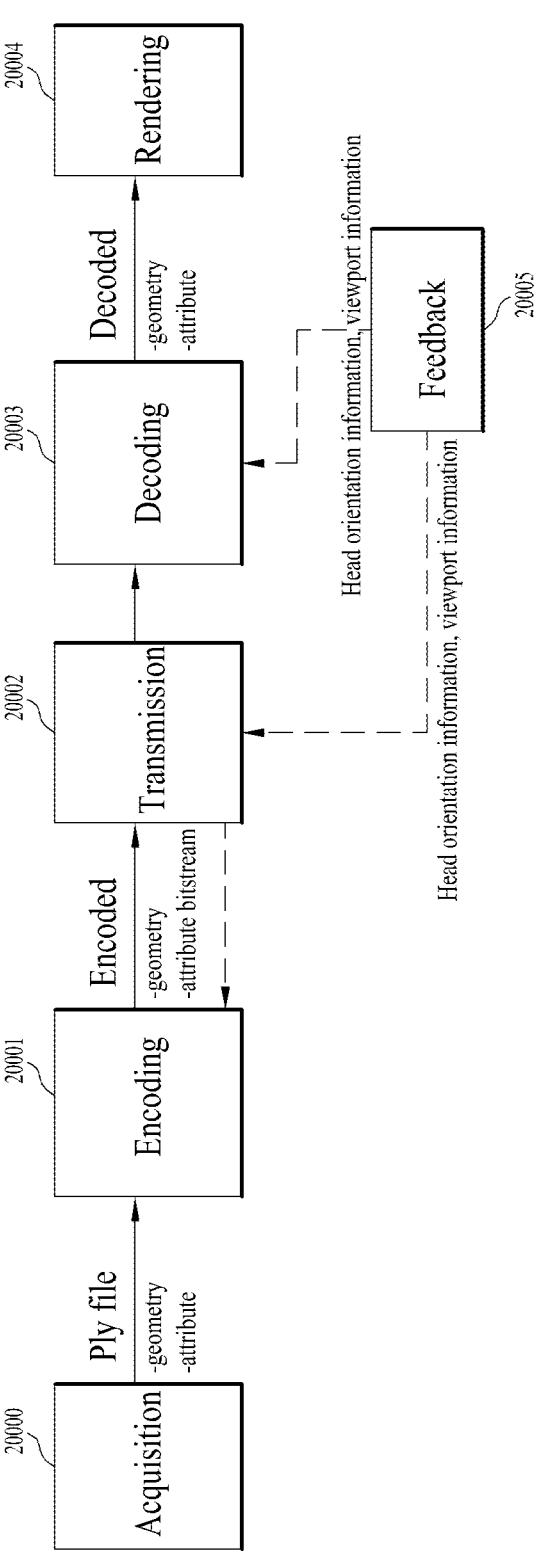
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
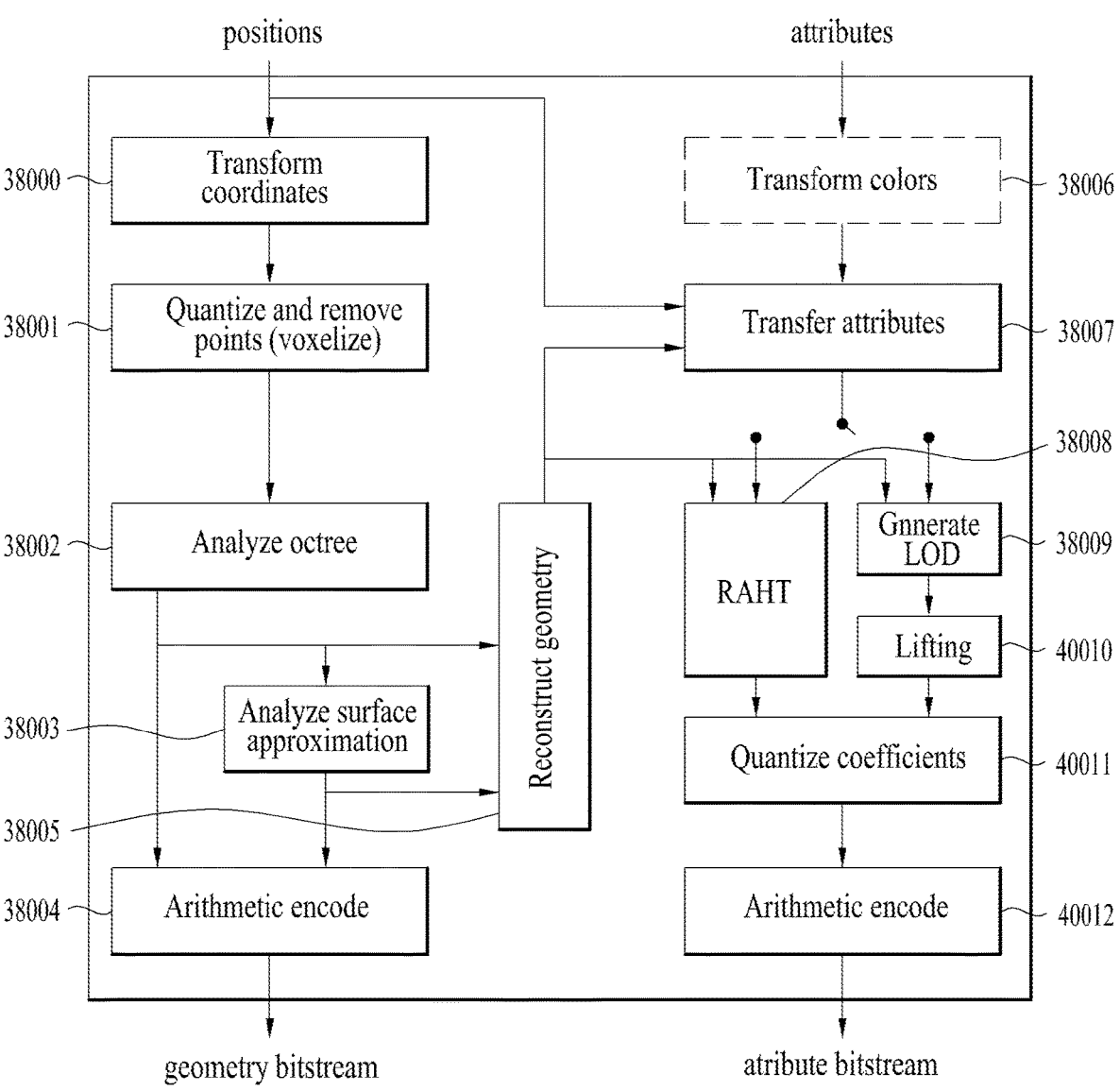
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing apparatus, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
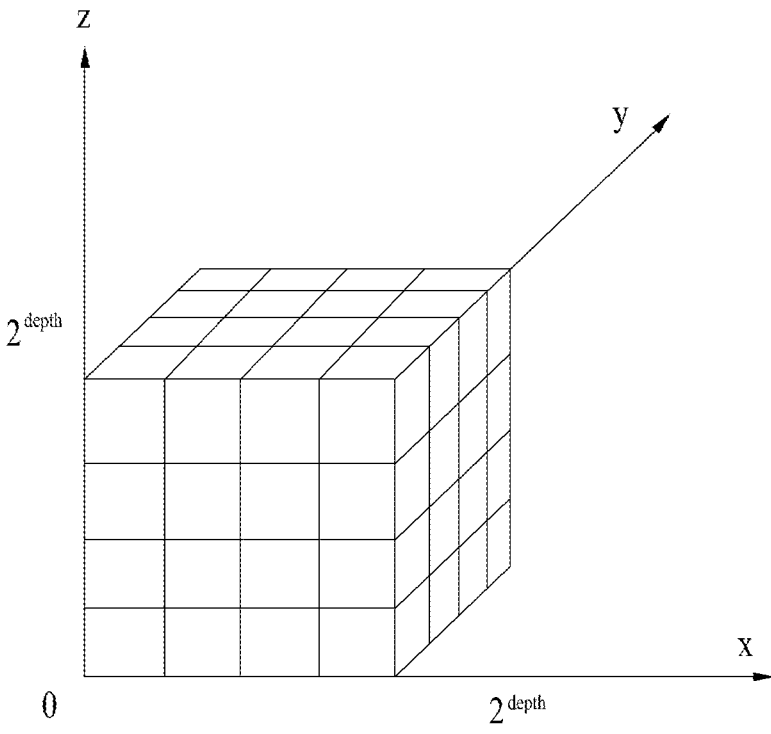
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
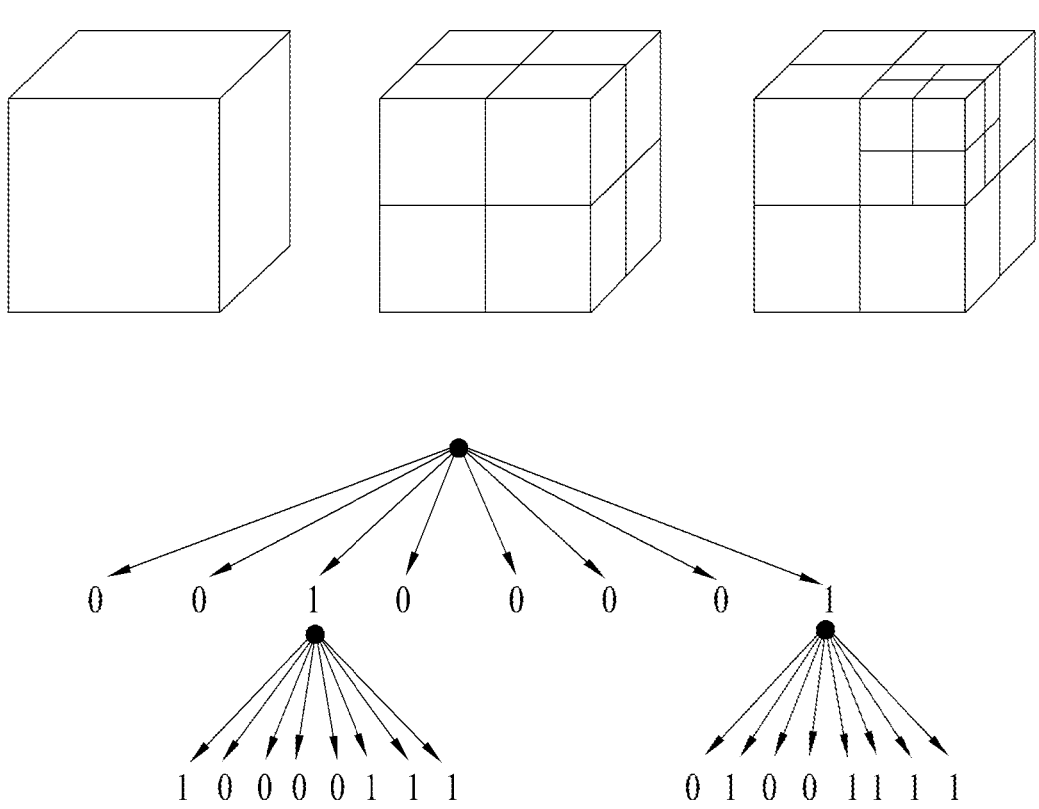
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and (2d, 2d, 2d). Here, 2d may be set to a value constituting the smallest bounding box surrounding all points of the point cloud content (or point cloud video). Here, d denotes the depth of the octree. The value of d is determined in the following equation. In the following equation, (xintn, yintn, zintn) denotes the positions (or position values) of quantized points.

$$d=\mathrm{Ceil}(\mathrm{Log}\ 2(\mathrm{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: 1) calculating the centroid value of each vertex, 2) subtracting the center value from each vertex value, and 3) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \quad 1)$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad 2)$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad 3)$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| Triangles formed from vertices ordered 1, . . . , n |
| --- |
| n triangles |
| 3 (1,2,3) |
| 4 (1,2,3), (3,4,1) |
| 5 (1,2,3), (3,4,5), (5,1,3) |
| 6 (1,2,3), (3,4,5), (5,6,1), (1,3,5) |
| 7 (1,2,3), (3,4,5), (5,6,7), (7,1,3), (3,5,7) |
| 8 (1,2,3), (3,4,5), (5,6,7), (7,8,1), (1,3,5), (5,7,1) |
| 9 (1,2,3), (3,4,5), (5,6,7), (7,8,9), (9,1,3), (3,5,7), (7,9,3) |
| 10 (1,2,3), (3,4,5), (5,6,7), (7,8,9), (9,10,1), (1,3,5), (5,7,9), (9,1,5) |
| 11 (1,2,3), (3,4,5), (5,6,7), (7,8,9), (9,10,11), (11,1,3), (3,5,7), (7,9,11), (11,3,7) |
| 12 (1,2,3), (3,4,5), (5,6,7), (7,8,9), (9,10,11), (11,12,1), (1,3,5), (5,7,9), (9,11,1), (1,5,9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
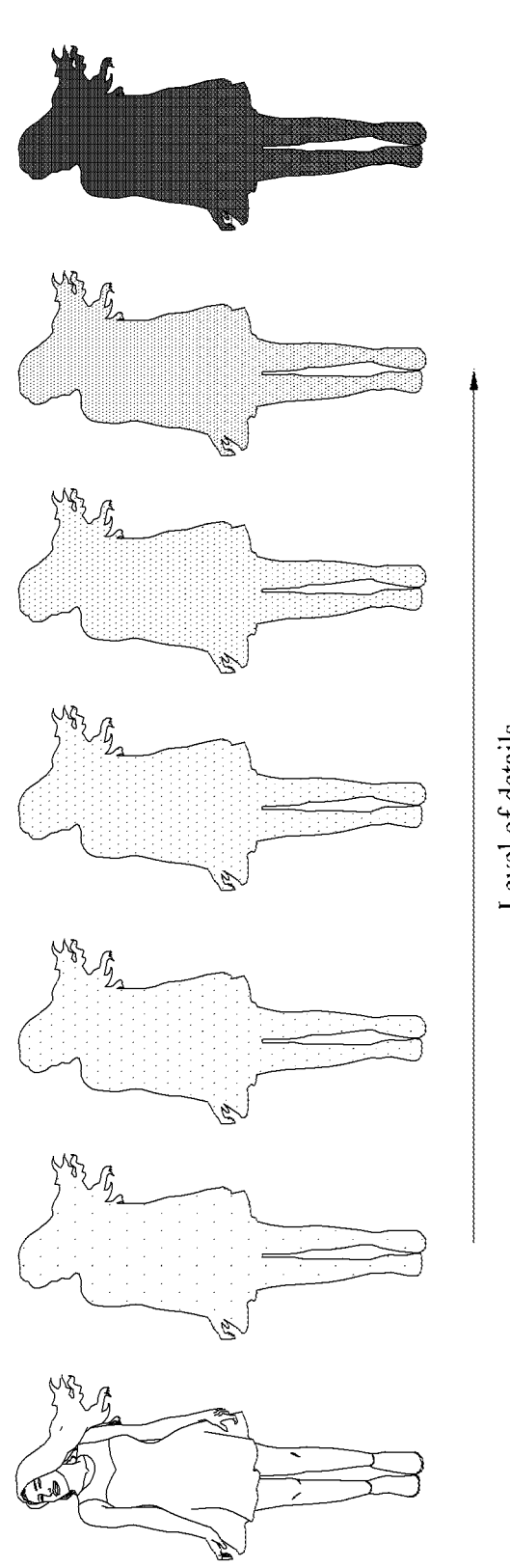
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
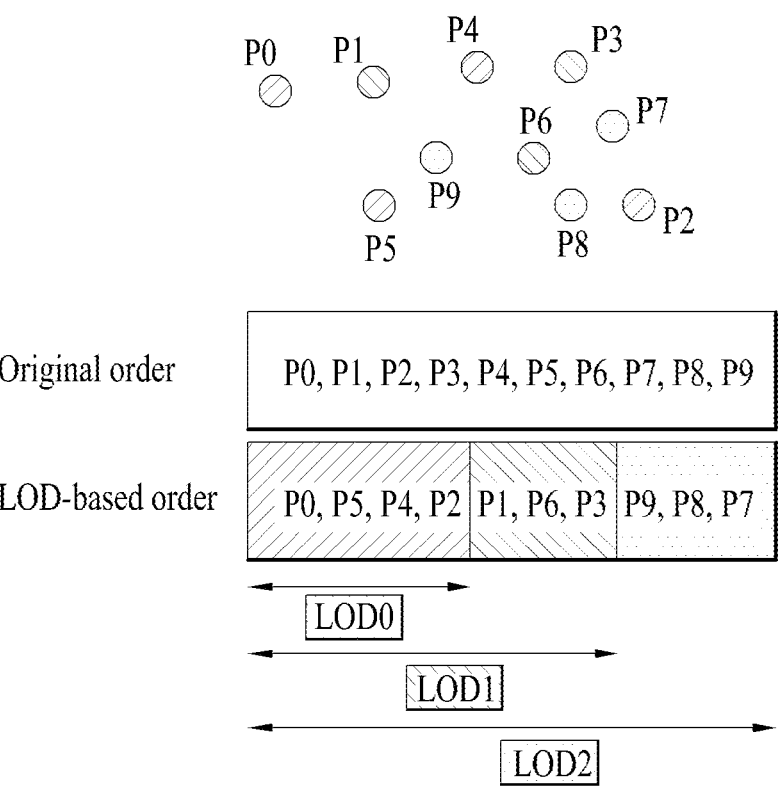
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

```
TABLE Attribute prediction residuals quantization pseudo code
int PCCQuantization(int value, int quantStep) {
if( value >=0) {
return floor(value / quantStep + 1.0 / 3.0);
} else {
return −floor(−value / quantStep + 1.0 / 3.0);
}
}
```

```
TABLE Attribute prediction residuals inverse quantization pseudo code
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix},$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
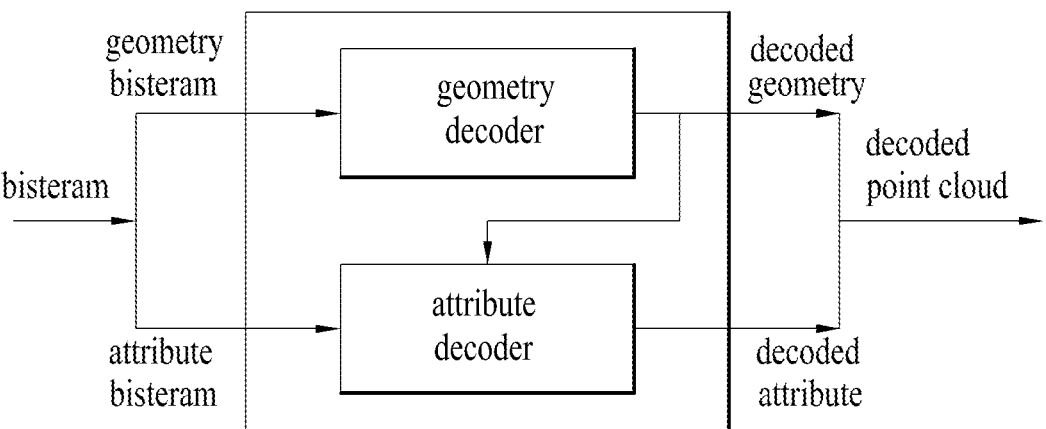
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
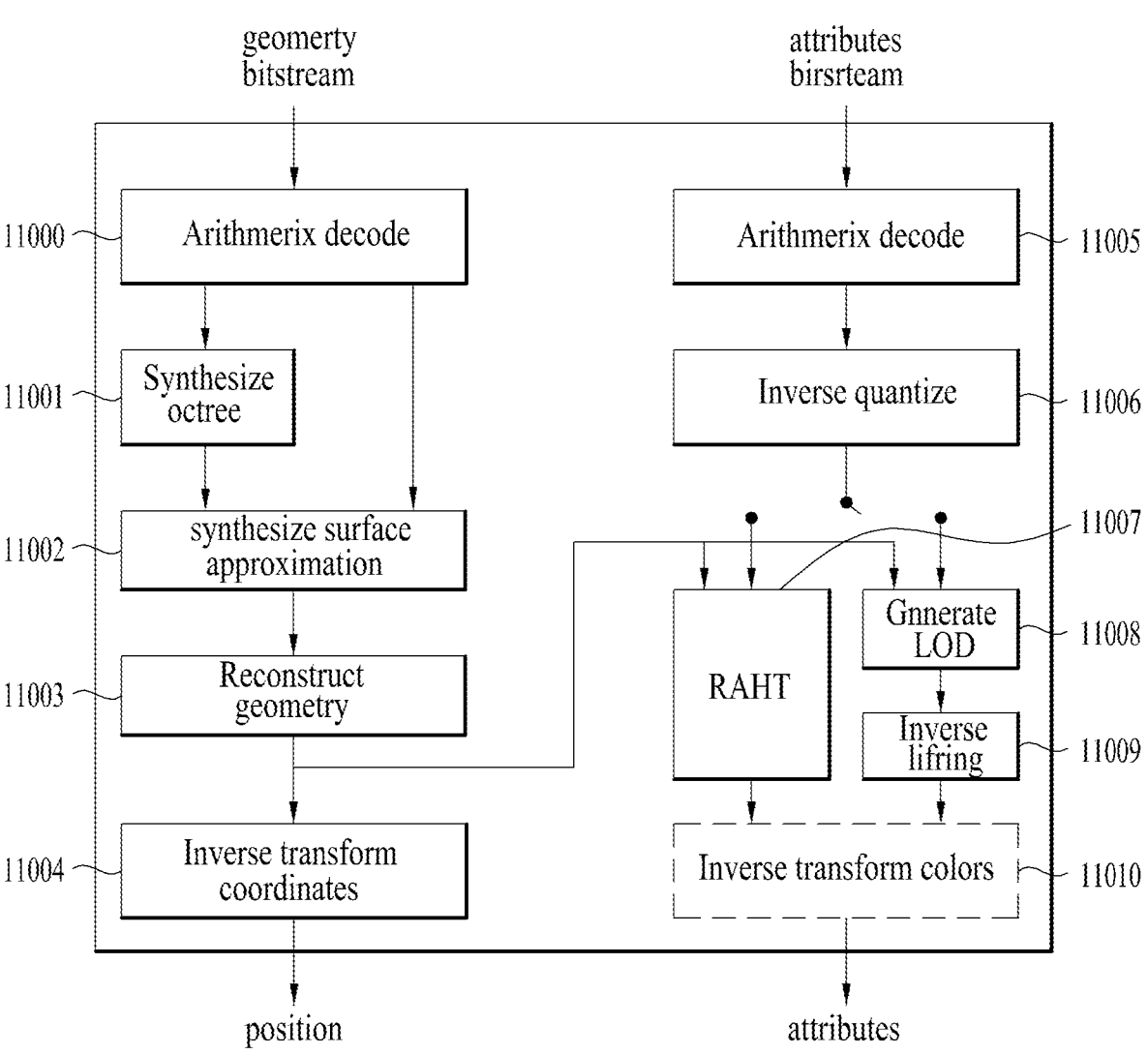
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is a reverse process of the encoding operation of the point cloud encoder described with reference to FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as a reverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing apparatus, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
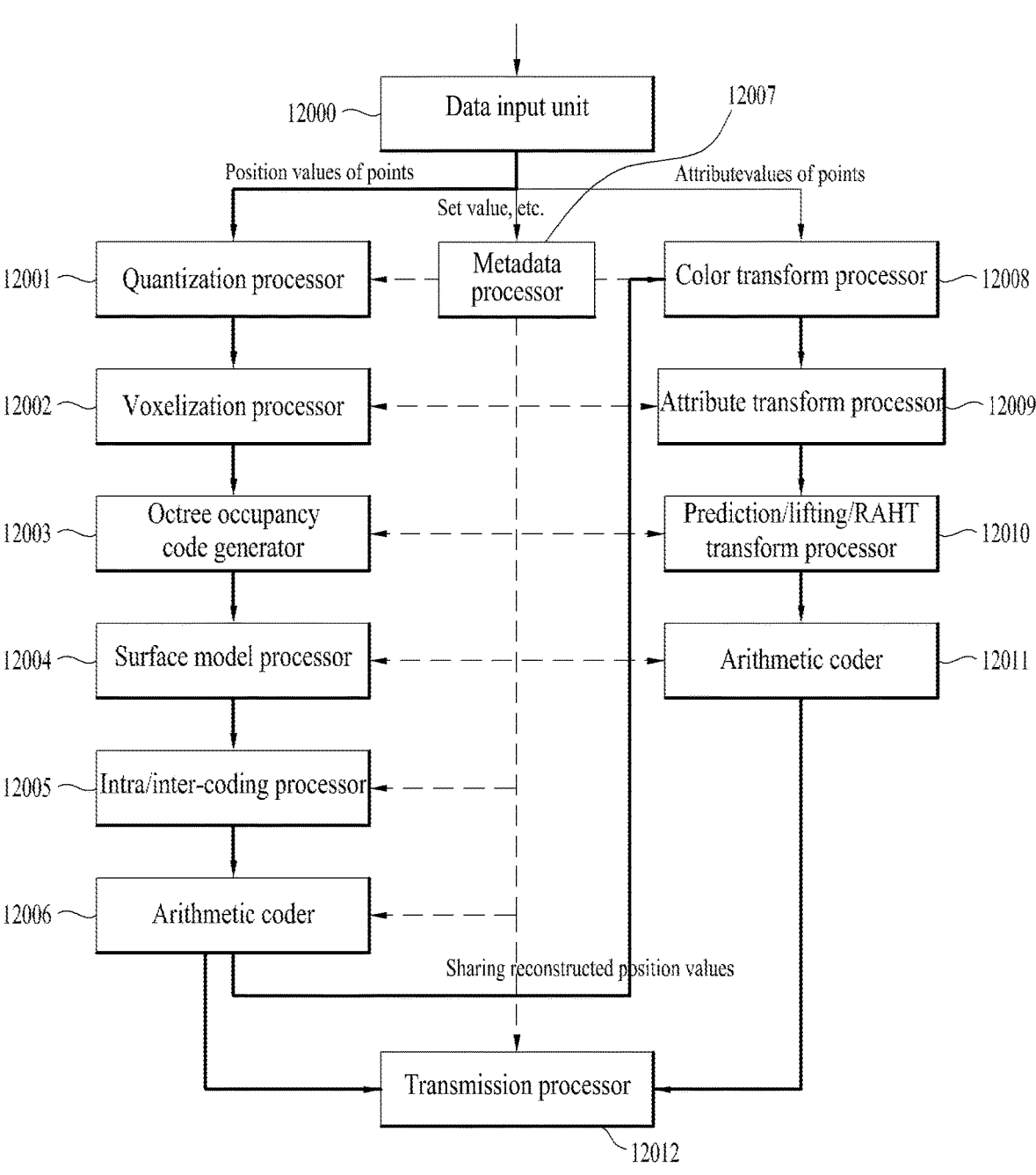
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of operations and methods which are the same as or similar to the operations of the point cloud encoder and the encoding methods described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
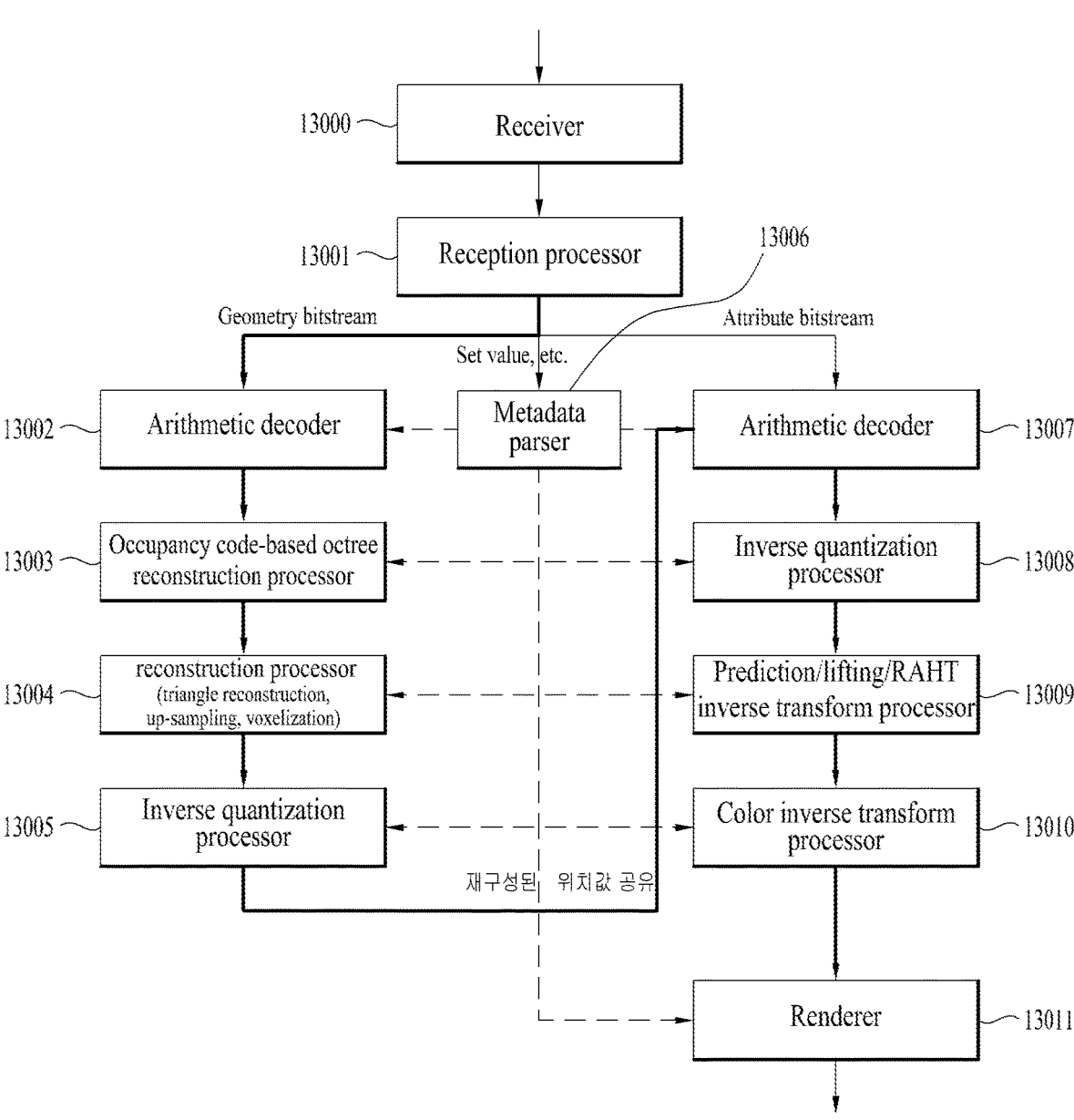
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods which are the same as or similar to the operations of the point cloud decoder and the decoding methods described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform the reverse of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method that is the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation that is the same as or similar to that of the surface approximation synthesizer 11002 and/or geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method that is the same as or similar to the operation and/or inverse quantization method of the inverse quantizer 11006.

The prediction/lifting/RAHT inverse transform processor 13009 according to the embodiments may process the recon-structed geometry and the inversely quantized attributes. The prediction/lifting/RAHT inverse transform processor 13009 performs one or more of operations and/or decoding that are the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding that is the same as or similar to the operation and/or inverse transform coding of the color inverse transformer 11010. The renderer 13011 according to the embodiments may render the point cloud data.

Figure 14:
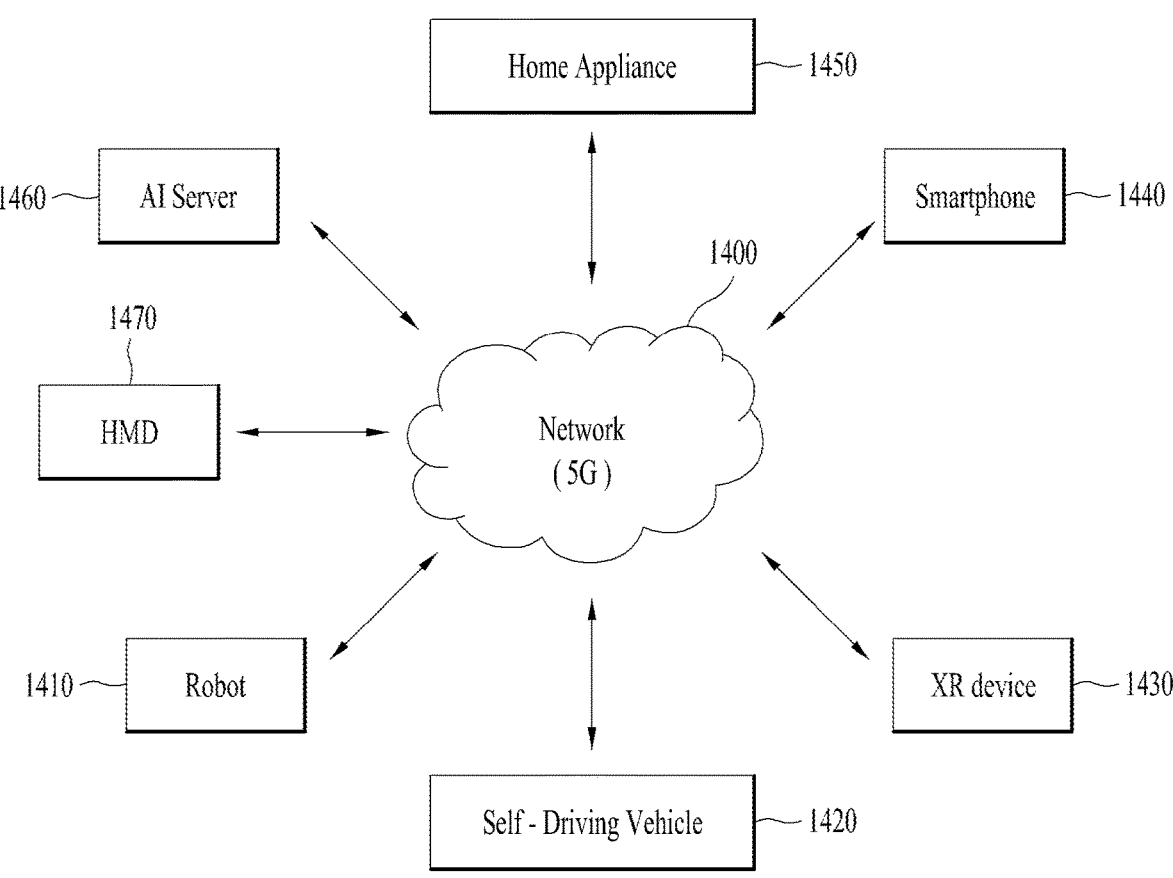
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may corre-spond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission/reception device according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+Self-driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

The PCC data encoder according to the embodiments may correspond to an encoding device, an encoder, a point cloud transmission device, a point cloud data encoder, and the like.

The PCC data decoder according to the embodiments may correspond to a decoding device, a decoder, a point cloud reception device, a point cloud data decoder, and the like.

According to embodiments, geometry may be referred to as geometry information, geometry data, or the like, and an attribute may be referred to as attribute information, attribute data, or the like.

The method/device according to the embodiments may refer to a method/device for transmitting or receiving point cloud data according to embodiments.

Figure 15:
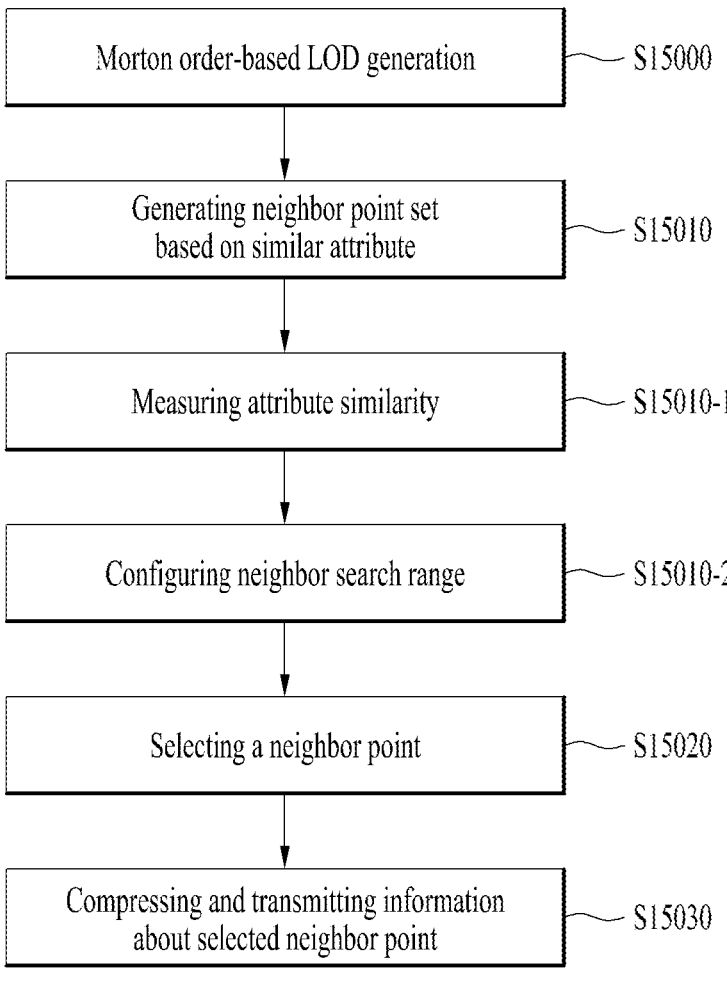
FIG. 15 illustrates an attribute encoding and decoding process according to embodiments.

FIG. 15 illustrates an attribute encoding and decoding process according to embodiments.

Figure 20:
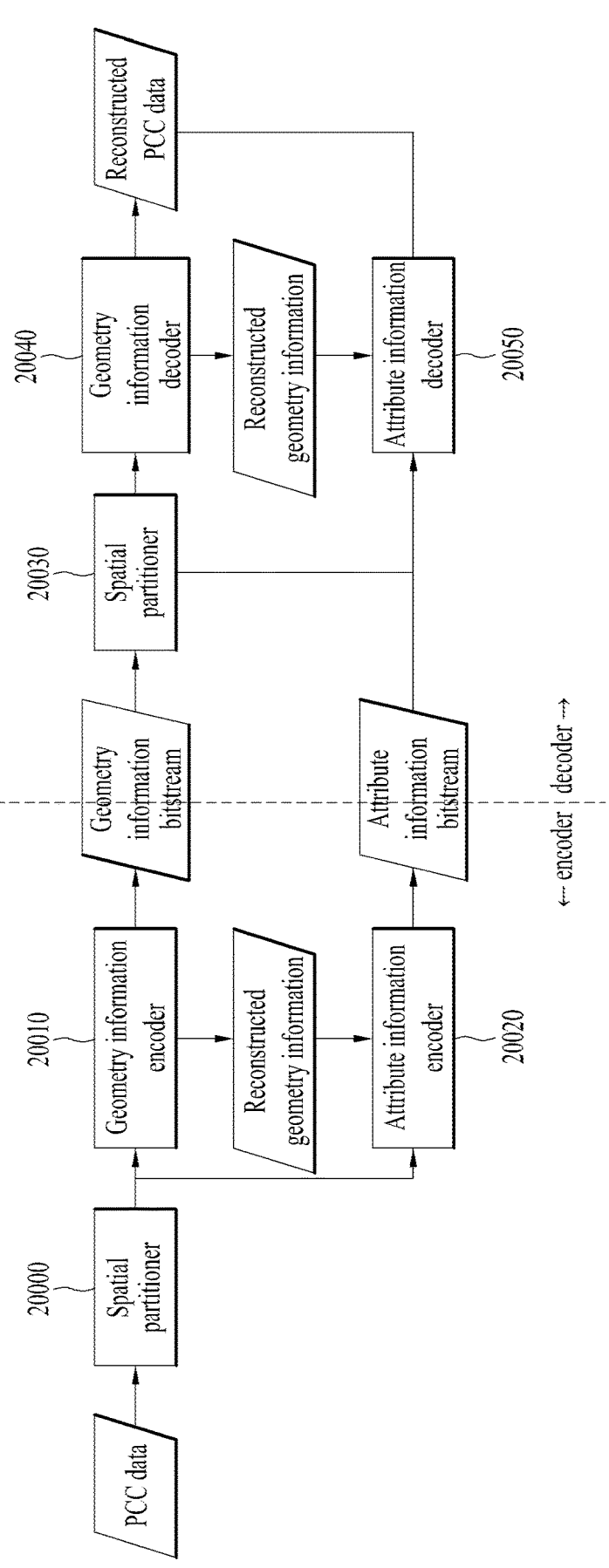
FIG. 20 shows a PCC encoder and a PCC decoder according to embodiments.
Figure 21:
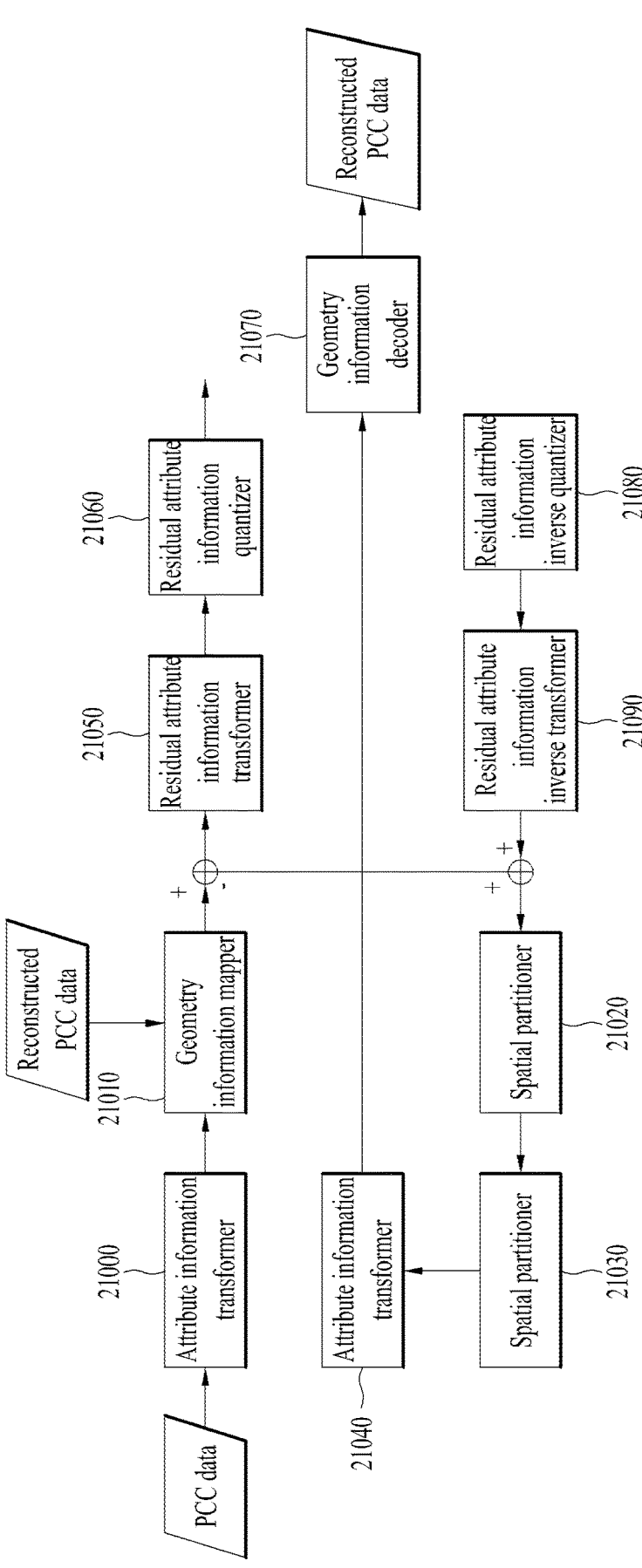
FIG. 21 shows an attribute information encoder according to embodiments.
Figure 23:
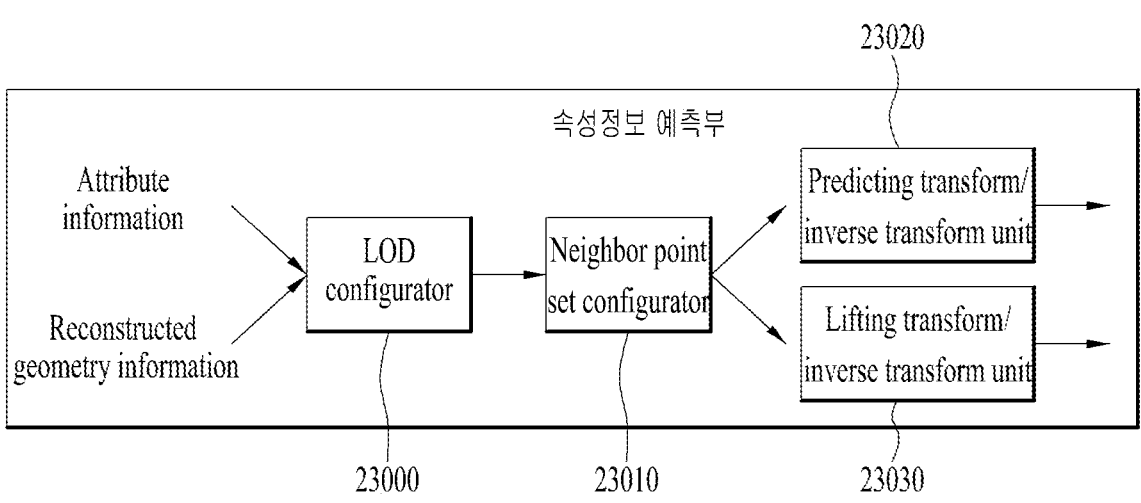
FIG. 23 shows an attribute information prediction unit according to embodiments.
Figure 28:
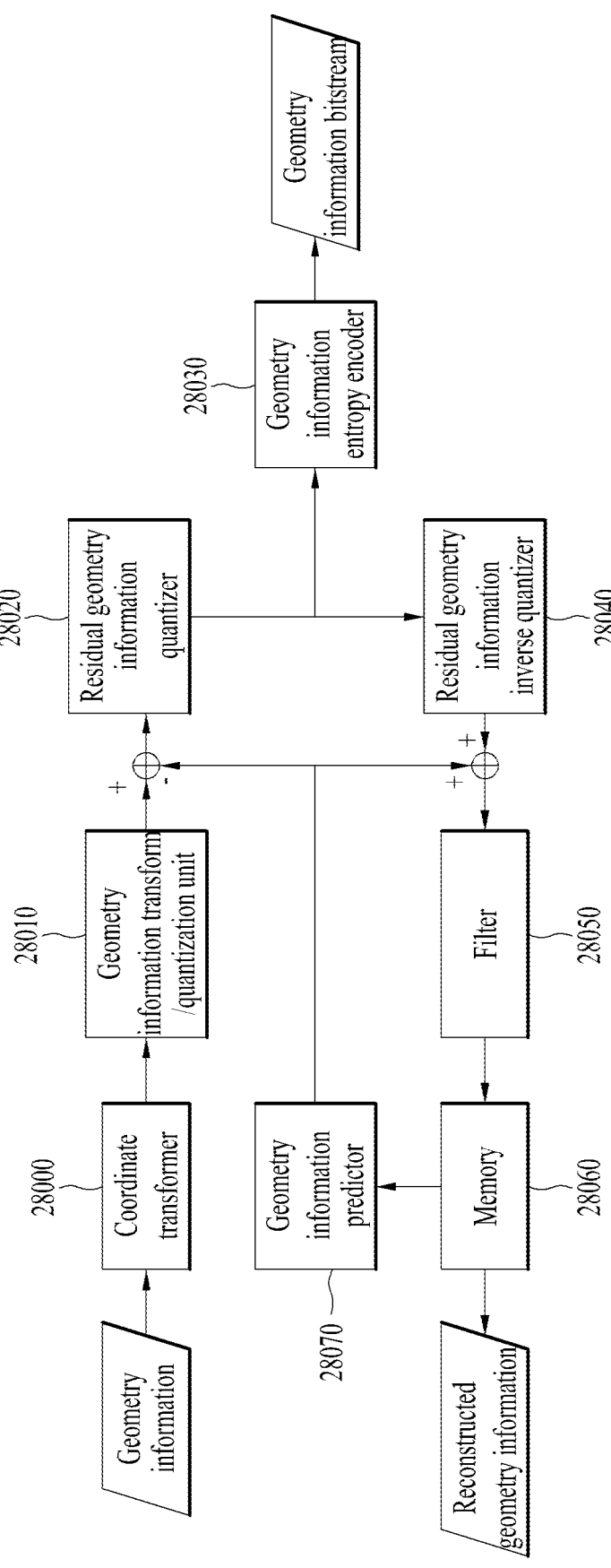
FIG. 28 shows a geometry encoder according to embodi-ments.
Figure 30:
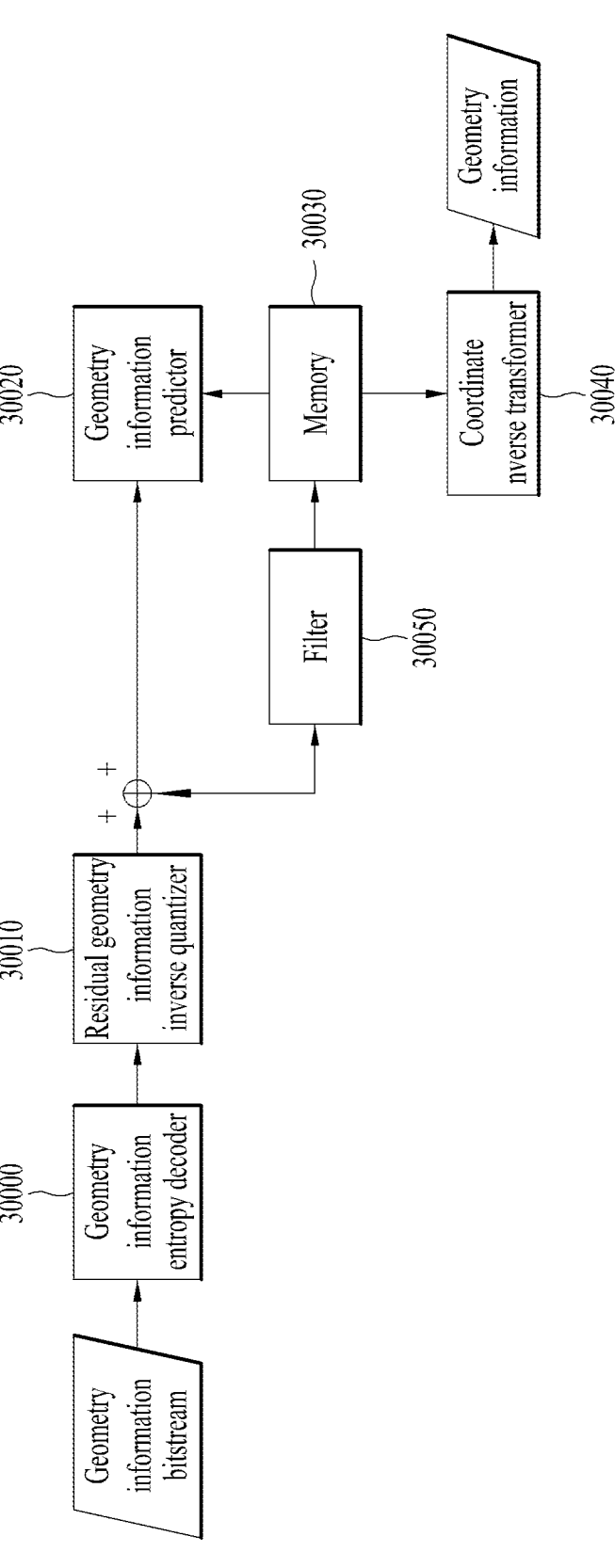
FIG. 30 shows a geometry decoder according to embodi-ments.

The encoding and/or decoding process of FIG. 15 may be performed by the transmission device 1000, the point cloud video encoder 10002, the reception device 10004, the point cloud video decoder 10006, and the encoding 20001 and decoding 20003 of FIG. 2, the encoder of FIG. 4, the decoder of FIGS. 10 and 11, the encoder of the transmission device of FIG. 12, the decoder of the reception device of FIG. 13, the XR device 1430 of FIG. 14, the PCC encoder and decoder of FIG. 20, the attribute encoder of FIG. 21, the attribute decoder of FIG. 22, the attribute information predictor included in the encoder and decoder of FIG. 23, the geometry encoder of FIG. 28, the attribute encoder of FIG. 29, the geometry decoder of FIG. 30, the attribute decoder of FIG. 31, and the like. Each of these components may correspond to hardware, software, a processor, and/or a combination thereof, and will be hereinafter referred to as a method/device according to embodiments for short.

Embodiments may provide a method to increase the compression efficiency for attributes of geometry-based point cloud compression (G-PCC) for 3D point cloud data compression. In the following description, an encoder and an encoding device refer to the same element, and a decoder and a decoding device refer to the same element.

The embodiments propose a method of generating a similar attribute-based neighbor point set to increase compression efficiency based on a method for configuration of a neighbor point set in the G-PCC attribute encoding/decoding process.

For example, embodiments include proposals for: a similar attribute-based neighbor set generation method; a signaling scheme for supporting the similar attribute-based neighbor set generation, and/or a signaling scheme for supporting the two methods.

A point cloud is composed of a set of points, and each of the points may have geometry information and attribute information. The geometry information includes three-dimensional position (XYZ) information, and the attribute information includes color (RGB, YUV, etc.) and/or reflectance values. The G-PCC encoding process according to the embodiments may include compressing the geometry and compressing the attribute information based on the geometry reconstructed with position information changed through compression (reconstructed geometry=decoded geometry). The G-PCC encoding process may be performed by the encoder, the transmission device, or the like according to the embodiments.

The G-PCC decoding process according to the embodiments may include receiving an encoded geometry bitstream and attribute bitstream, decoding geometry, and decoding attribute information based on the geometry reconstructed through the decoding. The G-PCC decoding process may be performed by the decoder, the reception device, or the like according to the embodiments.

The attribute information compression process uses a technique such as prediction transform, lifting transform technique, or RAHT according to the above-described embodiments.

In the prediction transform and the lifting transform, points may be grouped by dividing the same into Levels of Detail (hereinafter referred to as LOD) (see FIGS. 8 and 9).

This operation is referred to as 1) LOD generation. Hereinafter, a group having different LODs may be referred to as a set LOD1.

Here, 1 represents LOD and is an integer starting from 0. LOD0 is a set composed of points having the longest distances therebetween. As 1 increases, the distance between points in LOD1 decreases.

The point cloud rendering operation according to the embodiments may be performed to represent point cloud content based on the LOD.

After set LOD1 is generated, the X (>0) nearest neighbor neighbors may be searched for in a group having the same or lower LOD (a group in which the distance between nodes is large) 2) based on the set LOD1 and registered in the predictor as a neighbor point set. X is the maximum number of points that may be configured as neighbors. X may be input as a user parameter.

As shown in FIG. 9, neighbors of P3 belonging to LOD1 are searched for in LOD0 and LOD1. The three nearest neighbor nodes may be P2, P4, and P6. These three nodes are registered in the predictor of P3 as a neighbor point set.

Every point may have one predictor. Attributes are predicted from the neighbors registered in the predictor. The predictor may have a neighbor point set and register "½ distance=weight" based on the distance from each neighbor.

For example, the predictor of node P3 has (P2 P4 P6) as a neighbor point set and calculates the weights based on the distance from each neighbor. The weights of the respective neighbors are $1/\sqrt{(P2-P3)^2}$, $1/\sqrt{(P4-P3)^2}$, and $1/\sqrt{(P6-P3)^2}$.

Once the neighbor point set of the predictor is configured, 3) the weights of the respective neighbor points may be normalized with the sum of the weights of the neighbor points.

For example, the weights of all neighbor points in the neighbor point set of node P3 are added (total_weight=$1/\sqrt{(P2-P3)^2}+1/\sqrt{(P4-P3)^2}+1/\sqrt{(P6-P3)^2}$), and the weight of each neighbor point is divided by the sum of the weights ($1/\sqrt{(P2-P3)^2}$/total_weight, $1/\sqrt{(P4-P3)^2}$/total_weight, $1/\sqrt{(P6-P3)^2}$/total_weight). Thereby, the weights are normalized.

4) Attributes may be predicted through a predictor. The average of values obtained by multiplying the attributes of the neighbor points registered in the predictor by a weight may be used as a predicted result, or a specific point may be used as a predicted result. After pre-calculating the compressed result value, a method capable of generating the smallest stream may be selected.

5) The residual between the attribute value of a point and an attribute value predicted by the predictor of the point may be encoded and be signaled together with the method selected by the predictor to the receiver.

The decoder may perform the same operations as operations 1) to 3). In operation 4), it may decode the signaled prediction method and predict an attribute value according to the method. In operation 5), the decoder may restore the attribute value by decoding the transmitted residual and adding the value predicted in operation 4) to the decoded residual.

The embodiments may include the method related to operation 2) described above, that is, the neighbor point set configuration method, and may be applied to both the transmitter and the receiver. For the configuration of the neighbor point set, attribute values are predicted based on neighbor points and the residual with respect to the predicted value is encoded and signaled. Accordingly, the predicted value and the size of the residual value may vary depending on a criterion for configuring the neighbor point set. As the similarity of a predicted value increases, the magnitude of the residual value decreases, and thus only small data may need to be encoded and transmitted. Therefore, the neighbor point set configuration method may have a significant effect on the attribute compression efficiency of the point cloud. Embodiments that may increase the accuracy of prediction and compression performance are disclosed herein.

In the geometry-based nearby relationship of a point cloud, the probability of having similar attributes is high, and accordingly the predictor may configure a neighbor set based on the distance in performing prediction. However, such a tendency may vary depending on the characteristics of the point cloud content.

In a point cloud captured by a 3D scanner, the distance between neighbor points is very small and the points may be densely distributed. In this case, the probability that similar attributes according to the distance are present is high. However, the probability is not high in all cases. Depending on the characteristics of the captured object, the probability of presence of similar attributes according to the distance may vary. That is, even if the distance between the points is small, the difference between similarity attributes of the points may be large.

In the case of a point cloud captured through LiDAR, the distance between neighbor points may be significantly large, and therefore the actual difference in distance may be large even when it is determined that the geometry-based nearby relationship between points in the content is high. In this case, the meaning of configuring a distance-based neighbor point set and predicting attribute values through the configured points may not be significant.

That is, the probability of having a similar attribute according to geometry-based nearby relationship may or may not be high depending on the characteristics of the point cloud content. When a set of distance-based neighbor points is configured for content where there is little relation between geometry-based nearby relationship and similar attributes, the residual with respect to the predicted attribute value may be large. In addition, since the large residual is encoded and transmitted as a bitstream, the size of the stream may be increased.

Embodiments intend to propose a neighbor point set configuration method capable of increasing attribute compression efficiency regardless of characteristics of content. For example, a method of generating a neighbor point set based on similar attributes and a signaling method for supporting similar attribute-based generation of a neighbor point set are proposed.

Changes and combinations of the embodiments are possible. Terms used in the present disclosure may be understood based on the intended meaning of the terms within the scope of common uses thereof in the relevant field.

The neighbor set generation according to the embodiments may be performed in PCC attribute encoding/decoding of the PCC encoder/decoder, the point cloud transmission device, the reception device.

When the technique of prediction transform or lifting transform is used in the attribute encoding/decoding operation, a set LOD1 may be generated and a neighbor point set of a predictor may be generated based on the generated set LOD1.

The attribute encoding and/or attribute decoding operation according to the embodiments of FIG. 15 may include S15000, S15010, S15010-1, S15010-2, S15020 and/or S15030. According to embodiments, the respective steps may be performed in order. The steps may be selectively combined and performed.

S15000 Morton Order-Based LOD Generation

The method/device according to the embodiments may change the points of the point cloud to Morton code based on position values of x, y, and z, and may sort the points based on the changed Morton code values. LODs are generated based on the sorted points, and the points in the set LOD1 may be sorted based on the Morton order.

S15010 Generating a Neighbor Point Set Based on Similar Attributes

Points belonging to the set LOD1 may be selected as neighbor points to generate a neighbor point set in the following two cases.

1) Points belonging to sets LOD0 to LOD 1-1
2) Preceding points in sorted order among the points belonging to the set LOD1

A criterion for selecting a neighbor point from a set of LODs may be needed.

According to embodiments, neighbor point candidates may be selected based on similar attributes to generate a neighbor point set. Whether to generate the neighbor point set based on distance or similar attributes may be signaled to the decoder according to a method applied to the encoder.

The transmitter or receiver according to the embodiments may increase compression efficiency through the neighbor attribute-based neighbor set generation method.

For example, the embodiments may include an operation of the transmission device transmitting indexes to allow the reception device to identify an index having a point based on only attribute values, not a distance, without using Morton code, how an encoder (decoder) creates neighbor candidates for generation of a predicted value before generating an LOD, an operation of selecting a specific sample as a neighbor node through rate distortion optimization (RDO), and an operation of encoding and transmitting the predicted value between the node and a current node.

The method/device according to the embodiments may provide a encoding method based on an index indicating the sequential position of a point based on only attribute values (without using Morton code) in encoding. For example, before generating an LOD, the encoder/decoder generates neighbor point candidates (or neighbor candidates) for attribute prediction. Then, it may select a specific sample (point or node) based on RDO and use the same as a prediction node for the current node (point).

S15010-1 Measuring Attribute Similarity

To measure attribute similarity, Euclidean color distance 16000, correlated color temperature 16010, or distance metric (CIE94) 16020 defined in Commission on Illumination (CIE) may be selectively used (see FIG. 16).

The method for attribute similarity measurement used by the encoder may be signaled to the decoder.

According to the attribute similarity measurement method according to the embodiments, the method/device according to the embodiments may search for and select a neighbor point with high similarity, and compress (encode) and transmit/receive information about the selected neighbor point as described below. Configuring a neighbor search range and performing selection and compression based on the similarity measurement method may affect compression performance.

For example, the method/device according to the embodiments may use the methods 16000 to 16020 in selecting a point having the highest attribute similarity.

Assuming that the number of points searched for as neighbor nodes within a specific distance is 10, the Euclidean color distance 16000, the correlated color temperature 16010, and the like may be used to select one point with the highest attribute similarity.

S15010-2 Configuring Neighbor Search Range

In generating a neighbor point set of point Px belonging to the set LOD1, preceding points in order (or points having a Morton code less than or equal to the Morton code of Px) among the points belonging to sets LOD0 to LOD1-1 and the points belonging to the set LOD1 may be searched for a neighbor point set.

For example, Morton code-based search range configuration and/or octree-based search range configuration may be applied.

The method/device according to the embodiments may carry out the Morton code-based search range configuration.

The sets LOD1 and LOD0 to LOD1-1 are all sorted in Morton order. A point having the closest Morton code may be searched for among the preceding points in order among the points belonging to the sets LOD0 to LOD1-1 and the points belonging to the set LOD1. A neighbor point set may be generated by comparing the point with points corresponding to the number of neighbor search ranges before and after the point.

When the number of LODs is 1, comparison may be performed only by the number of preceding search ranges of neighbor point.

Since neighbor points are searched for in a specific range of points sorted based on the Morton code, the distance between points is not completely excluded in generating a neighbor point set. Basically, a neighbor search range may be configured based on distance.

The search range of neighbor points may be adjusted according to LOD. A search range according to the LOD may be signaled to the decoder.

Alternatively, a change rate of search ranges that are changed according to the LOD may be set. The search range change rate may be signaled to the decoder.

The method/device according to the embodiments may perform octree-based search range configuration.

Since the sets LOD0 to LOD1-1 are all sorted by the Morton code, it may be check whether points belong to the same parent node when the points are configured in an octree by comparing the Morton codes.

The neighbor search range may not be defined as a +-range based on a specific point. Instead, based on the Morton code value of point Px belonging to the set LOD1, the range of the upper parent node in the octree to which Px belongs may be determined. When a neighbor point set is searched in this way, a parent node higher in the octree to which point Px belongs may be determined as a node of the search range level, and the corresponding value may be signaled to the decoder. The search range level may be adjusted according to the LOD. The level may be directly set for each LOD or a ratio of the search range level may be set. In searching the neighbor point set in an octree-based neighbor range, the number to be compared to generate a neighbor point set may depend on the point distribution of content. Compared to the Morton code-based search range configuration, the amount of computation may increase. However, the increased amount of computation (a computation that simply checks whether a Morton code is within the range) is not large. When points have the same parent node, they are highly likely to be neighbor nodes. Accordingly, the accuracy of the neighbor range may be higher than in the Morton code-based search range configuration.

S15020 Selecting a Neighbor Point

A neighbor point set may be configured by selecting neighbor points by comparing the distances or attribute values of the points in a specified neighbor search range.

A method/device according to embodiments may perform distance-based neighbor point selection.

Distances between the points in the neighbor search range and Px (the current point) may be calculated and closest points as many as the maximum number of neighbor point sets may be selected to generate a neighbor point set.

The maximum number of neighbor point sets applied to the encoder may be signaled to the decoder.

The method/device according to the embodiments may perform neighbor point selection based on similar attributes.

The attributes of points in the neighbor search range which are similar to that of Px (the current point) may be measured by the method selected in the similar attribute measurement method (see FIG. 16), and the points with the highest similarity are selected as many as the maximum number of neighbor point sets.

The maximum number of neighbor point sets applied to the encoder may be signaled to the decoder.

In addition, a minimum attribute similarity threshold for registration in the neighbor point set may be defined. When the value of similarity is less than the minimum attribute similarity threshold (similarity is low), the corresponding point may not be registered as a neighbor point.

The minimum attribute similarity threshold applied to the encoder may be signaled to the decoder.

When there is no neighbor point that may be registered according to the threshold, direct coding may be performed rather than using a residual value through prediction.

The method/device according to the embodiments may generate a neighbor point set based on distance and similar attributes.

N neighbor points based on distance (neighbor points that are at close distances) may be selected, and the maximum number of neighbor point sets. Among the selected points, points as many as the maximum number of neighbor point sets may be selected as neighbor points based on attributes. The number of neighbor points primarily selected based on distance may be signaled to the decoder.

A candidate list including the points selected using the above-described method (distance-based selection, attribute-based selection, selection based on distance and attribute) is used in the next step.

S15030 Compressing and Transmitting Information about Selected Neighbor Point

The transmission device and the encoder according to the embodiments may compress and transmit information about the selected neighbor points as described below.

For attribute encoding, a prediction candidate list is configured, and one candidate is selected through RDO between prediction candidates and used as a prediction value. The prediction candidate list index of the selected candidate is entropy-coded and transmitted to the decoder. When the selected candidate is an attribute-based candidate, a reference prediction candidate index needs to be additionally transmitted. The reception device and the decoder may perform decoding based on the reference prediction candidate index.

The transmission device and the encoder according to the embodiments may generate a prediction candidate list.

For example, 128 points preceding the current point and 128 points following the current point based on the Morton code of the current point may be sorted based on the Euclidean distance, and then the three lowest candidates may be defined as distance-based candidates and added to the prediction candidate list (Distance-based neighbor point selection).

Also, the 128 points preceding the current point and the 128 points following the current point based on the Morton code of the current point may be sorted based on the difference between the attributes thereof and the source attribute, and then one lowest candidate may be defined as an attribute-based candidate and added to the prediction candidate list (Similar attribute-based neighbor point selection).

Also, within the search range (the 128 points preceding the current point and the 128 points following the current point based on the Morton code of the current point), candidates may be added to the prediction candidate list based on distance and similar attributes.

The order of candidates in the list may be determined through an agreement between the encoder and the decoder.

The RDO may be performed for the prediction candidates of the transmitter and the encoder according to the embodiments.

For example, one candidate is selected based on the difference between the attributes of the four candidates and the source attribute and the weighted sum of the bit numbers used for attribute coding, and the attribute value of the candidate is selected as a predicted value. The number of candidates selected based on the attributes may be 1 to 4. As a method of searching for a neighbor point based on attributes, RDO may be used or a point having the closest attribute to the current point may be searched.

The prediction candidate list index of the selected candidate may be entropy-coded. This is because it is necessary to send to the decoder the index of the candidate used as the predicted value in the candidate list. In the distance-based prediction mode, the position value of the point is included in the Morton code, and thus the reception device may recognize the position of the geometry.

For example, when the index of the current point is 10 and the index of the point having the most similar attribute value to that of the current point is 8, the difference in index is −2. The offset of −2 should be transmitted to the encoder.

That is, a reference point candidate for encoding the current point is searched for based on attributes (or based on distance or both distance and attributes), and the index difference related to the position of the point is binarized and transmitted. In this case, to compress multiple points, an index difference related parameter may be required for each point. The same index difference in each group of multiple points may be encoded and transmitted to the decoder. Since the decoder may recognize the index of neighbor point 1 and the index of neighbor point 2 in order of the received difference values, decoding may be performed.

For example, a bitstream is generated by performing 2-bit fixed-length coding. Alternatively, the bitstream may be generated through various entropy coding techniques such as arithmetic coding, CABAC, and Huffman.

With 2 bits, 0 to 3 may be expressed. Indexes that may be expressed as 0 to 3 may be compressed using fixed-length coding. Alternatively, entropy coding such as arithmetic coding, CABAC, or Huffman may be applied.

When the selected candidate is a candidate selected based on the attribute among the three neighbor point selection methods, the index thereof should be signaled to the decoder. Binarization may be performed using the reference prediction candidate index as shown in FIG. 19, and a bitstream may be generated through arithmetic coding. The sign value may be transmitted by sig_flag. The absolute value of the index difference may be binarized through gt1_flag, partity_flag, gt3_flag, and remain_data and transmitted through arithmetic encoding.

sig_flag indicates whether the value is positive number or negative.

gt1_flag indicates 1 when the absolute value of the index difference is greater than 1, and indicates 0 when the absolute value is less than 1. That is, if the index difference is between −1 and 1, it is 0, otherwise it is 1.

gt3_flag indicates 1 when the absolute value of the index difference is greater than 3, and indicates 0 when the absolute value is less than 1.

remain_data may carry an absolute value of the index difference other than gt1_flag and gt3_flag.

parity_flag indicates the parity of the absolute value of the index difference. When gt3_flag is 1, remain_data may be binarized through Golomb-Rice coding and transmitted to the decoder through arithmetic coding because the absolute value of the index difference may be large.

When the selected candidate is an attribute-based candidate, the sign of the index difference may be carried by one flag and the remaining absolute value may be binarized through Golomb-Rice coding and subjected arithmetic coding.

Alternatively, arithmetic coding may be performed by binarizing the absolute value through Huffman coding based on the pre-checked statistical characteristic of the absolute value of the index difference. When the Huffman code exceeds a specific bit number, fixed-length coding may be performed on the remaining value.

A point having an attribute value closest to the attribute value of point k-NN having the closest Euclidean distance to the current point in SearchRange1, in which sorting is performed based on distance, is searched for in SearchRange2 based on the Morton code and added to the prediction candidate list (SearchRange1 and SearchRange2 may be the same, and each SearchRange may vary depending on the LOD level).

Neighbors of the current point may be searched for in SearchRange1 (distance-based range), SearchRange2 (attribute-based range), or both ranges.

Among L prediction modes, L−1 prediction modes may be defined based on the average, median, an attribute of the closest point, an attribute of the second closest point, and the like with respect to the attribute value of k-NN. Alternatively, in the other mode, the offset, which is the difference value between the Morton code index of the current point and the Morton code index of a point having the smallest difference in attribute value, is additionally transmitted through a bitstream (attribute-based mode). That is, a prediction mode based on both the distance and/or attributes may be used. In this case, a precedence relationship of attribute-based prediction and distance-based prediction may be selected based on the characteristics of the data. After attribute-based prediction is performed first, distance-based prediction may be performed on the remaining points. Alternatively, attribute-based prediction may be performed on the remaining points after distance-based prediction is performed.

The reception device and the decoder according to the embodiments may perform decoding as described below.

For attribute decoding, a prediction candidate list may be configured. A prediction candidate list index may be received from the encoder, and the attribute value of a corresponding candidate may be used as a predicted value. The bitstreams of FIGS. 24 to 27 may carry the prediction candidate list index. When the candidate corresponding to the received index is an attribute-based candidate, the index difference may be restored by decoding sig_flag, gt1_flag, partity_flag, gt3_flag, and remain_data. Accordingly, the index of a neighbor node reference by the current point that is compressed and transmitted may be determined and restored. Therefore, since the prediction mode is used based on the attributes, prediction may be performed more accurately.

The reception method/device according to the embodiments may generate a prediction candidate list.

For example, 128 points preceding the current point and 128 points following the current point based on the Morton code of the current point may be sorted based on the Euclidean distance, and then the three lowest candidates may be defined as distance-based candidates and added to the prediction candidate list.

Also, the 128 points preceding the current point and 128 points following the current point based on the Morton code of the current point may be sorted based on the difference between the attributes thereof and the source attribute, and then one lowest candidate may be defined as an attribute-based candidate and added to the prediction candidate list.

The order of candidates in the list may be determined through an agreement between the encoder and the decoder.

The reception method/device according to the embodiments may restore the index difference.

For example, |index difference|=gt1_flag+parity_flag+2*gt3_flag+remain_data remain_data may be obtained through Golomb-Rice decoding.

The encoder may parse the prediction mode. When the mode is a mode that uses the attribute value of k-NN, the average or median agreed upon by the encoder or the attribute value of the N-th closest point is predicted and added to a differential signal to restore the attribute value When the parsed mode is an attribute-based prediction mode, the offset value may be additionally parsed, and the attribute value of the corresponding position may be used as a predicted attribute value, and be added to the differential signal to restore the attribute value.

According to an embodiment, SearchRange2 may be non-uniform depending on the index difference from the Morton code of the current point (e.g., Offset value: 1, 2, 3, 4, 6, 8, 10, 12)

According to an embodiment, SearchRange1 and SearchRange2 may be determined by an agreement between the encoder/decoder or may be calculated by the encoder/ decoder according to the LoD level or the number of points in the current LoD.

A method of receiving point cloud data according to embodiments may include receiving a bitstream including point cloud data and decoding the point cloud data.

The decoding according to the embodiments may include decoding geometry data of the point cloud data and decoding attribute data of the point cloud data.

The decoding of the attribute data may include generating a Level of Detail (LOD) based on the geometry data and the attribute data, generating a neighbor point set for a point of the point cloud data based on similar attributes, selecting a neighbor point from the neighbor point set, and decoding information about the selected neighbor point.

The generating of the neighbor point set according to the embodiments may include configuring a range for searching the neighbor point set based on a Morton code or an octree for the point cloud data.

The selecting of the neighbor point according to embodiments may include selecting a neighbor point based on a distance, a similar attribute, or both the distance and the similar attribute within the range.

The point cloud data reception method according to the embodiments may include generating a prediction candidate list for the attribute data, parsing a prediction candidate list index of the point cloud data (parsing an index value for a current point from the bitstream), and restoring an index difference based on metadata included in the bitstream.

Operation S15030 may be applied as an operation of parsing and decoding the information about the selected neighbor point by the reception method/device according to the embodiments.

FIG. 16 shows equations related to an attribute similarity measurement method according to embodiments.

FIG. 16 shows equations used in operation S15010-1 of FIG. 15.

According to the Euclidean color distance 16000, a color distance and a reflectance distance between two points may be calculated based on the R, G, and B color values of the attribute value.

According to the correlated color temperature (CCT) 16010, X, Y, and Z may be calculated based on the R, G, and B values of the point, and CCT values may be calculated based on X, Y, and Z. The CCT 16010 may change the RGB values to CIE (XYZ) values, normalize the CIE (XYZ) values to chromatic values, and calculate CCT values.

The CIE 16020 may be calculated based on the CIE1994 color difference model.

Using the method of the embodiments, similarity between points may be calculated, one neighbor point or the maximum number of neighbor points having high similarity may be searched for, and a corresponding residual value may be processed through prediction-based attribute coding exhibiting high efficiency.

That is, based on the values from the equations in FIG. 16, one or up to three points having the most similar value (=the highest attribute similarity or the most similar color or reflectance value) may be selected in the neighbor point list (of N points), and the difference thereof in index may be encoded.

Figure 17:
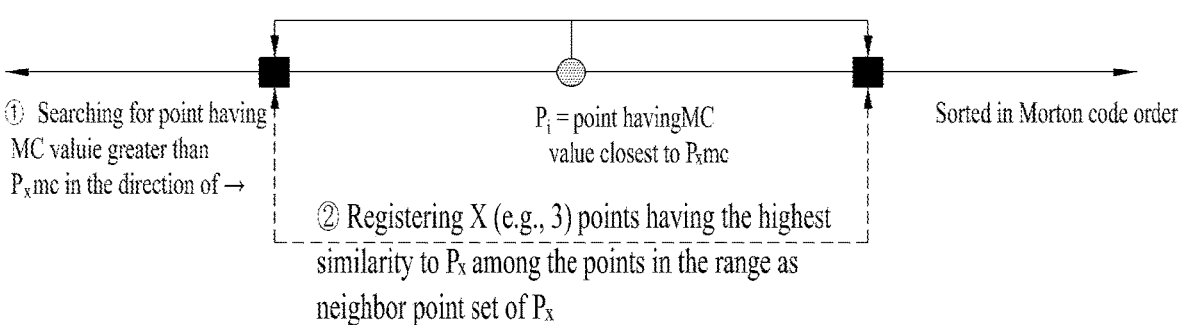
FIG. 17 illustrates a Morton code-based search range according to embodiments.

FIG. 17 illustrates a Morton code-based search range according to embodiments.

FIG. 17 shows the search range in S15010-2 of FIG. 15.

For example, when the current point is Px, the figure illustrates an operation of searching for a neighbor point set for Px from among the points arranged in the Morton code (mc) order in the LOD to which Px belongs and previous LODs.

①Among the points sorted in ascending order of Morton code, point(s) having a Morton code the value of which is greater than the Morton code value of the current point is searched for.

② The search range of the Morton code may be determined by a certain number of points. For example, based on the search range of 256 points, a predetermined number of points having the highest similarity to the current point may be selected and registered (generated) as a neighbor point set for the current point. The predetermined number may be, for example, three.

According to embodiments, a point with the highest similarity to the current point may be searched for, and a predetermined number of search ranges may be configured before and after the searched point. Additional neighbor points may be searched for in the configured search ranges.

Figure 18:
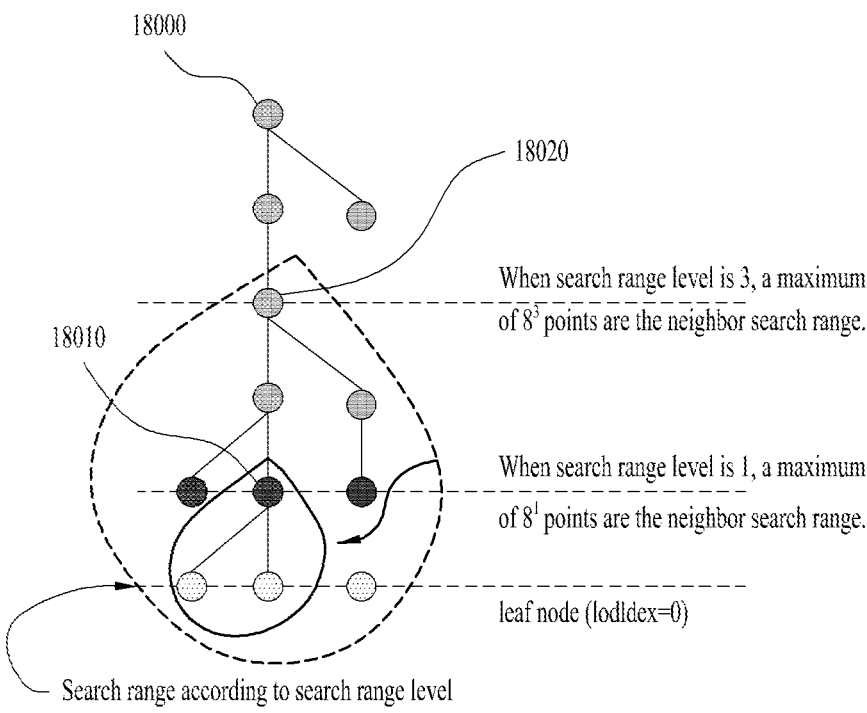
FIG. 18 illustrates an octree-based search range according to embodiments.

FIG. 18 illustrates an octree-based search range according to embodiments.

FIG. 18 shows the search range in S15010-2 of FIG. 15.

A method/device according to embodiments may generate an octree 18000. For example, an octree generator of the geometry encoder of the transmission device, an octree reconstructor of the geometry decoder of the reception device, or the like may generate the octree from the points. Also, the encoder/decoder, the attribute encoder/decoder, the attribute information predictor, or the like of the transmission/reception device may receive the octree from the geometry.

The method/device according to the embodiments may configure a search range from a leaf node (LOD index=0) and a node of a specific depth level in order to generate a neighbor point set for the current point.

For example, for search range 1, nodes (points) belonging to a parent node 18010 corresponding to high level 1 of the octree may be the search range. Since 8 nodes (points) may be included in one node, the search range may be 8^1 points.

For example, for search range 3, nodes (points) belonging to a parent node 18020 corresponding to high level 3 of the octree may be the search range. Based on the parent node, 8^3 points may be the neighbor search range may be.

FIG. 19 shows a prediction candidate list index of a selected candidate according to embodiments.

The transmission method/device according to the embodiments may present the index difference based on the fields as shown in FIG. 19 and encode and transmit the index difference.

sig_flag indicates the sign of the index difference. sig_flag equal to 1 indicates a positive value, and sig_flag equal to 0 indicates a negative value.

gt1_flag indicates 1 when the absolute value of the index difference to be transmitted after a neighbor node having a similar attribute is selected is greater than 1, and indicates 0 when the absolute value is less than 1.

gt3_flag indicates 1 when the absolute value of the index difference to be transmitted after a neighbor node having a similar attribute is selected is greater than 3, and indicates 0 when the absolute value is less than 1.

parity_flag indicates the parity of the absolute value of the index difference after a neighbor node having a similar attribute is selected. When the index difference is an even number, parity_flag may be 0. When the index difference is an odd number, parity_flag may be 1.

When gt3_flag is 1, remain_data may be binarized through Golomb-Rice coding and transmitted to the decoder through arithmetic coding. When gt3_flag is 0, remain_data is directly coded and transmitted to the decoder.

The reception method/device according to the embodiments may decode the index difference based on the fields of FIG. 19.

For example, the index difference is 1 when the index of the current point is 10, and the index of the neighbor point closest to the current point based on the attribute value is 9. When the index difference is 1, sig_flag is 1 because the index difference is positive. When the index difference is less than 1, gt1_flag is 0. When gt1_flag is 0, the remain field is not assigned a signaling value. As the total bits, only 2 bits are required because only 1, which is the index difference, needs to be compressed.

FIG. 20 shows a PCC encoder and a PCC decoder according to embodiments.

FIG. 20 may correspond to the transmission device 1000, the point cloud video encoder 10002, the reception device 10004, the point cloud video decoder 10006, and the encoding 20001 and decoding 20003 of FIG. 2, the encoder of FIG. 4, the decoder of FIGS. 10 and 11, the encoder of the transmission device of FIG. 12, the decoder of the reception device of FIG. 13, the XR device 1430 of FIG. 14, the PCC encoder and decoder of FIG. 20, the attribute encoder of FIG. 21, the attribute decoder of FIG. 22, the attribute information predictor included in the encoder and decoder of FIG. 23, the geometry encoder of FIG. 28, the attribute encoder of FIG. 29, the geometry decoder of FIG. 30, the attribute decoder of FIG. 31, and the like. Each of these components may correspond to hardware, software, a processor, and/or a combination thereof. The PCC encoder and PCC decoder of FIG. 20 may be referred to simply as a transmission/reception device according to embodiments. PCC data may be composed of geometry information and/or attribute information about a point.

An overall block diagram of the PCC data encoder and decoder may be represented as shown in FIG. 20. PCC encoding may be performed by the PCC encoder. The PCC encoder may include a geometry information encoder and/or an attribute information encoder.

Geometry information may be a coordinate vector represented as (x, y) in a two-dimensional Cartesian coordinate system, (y, θ) in a two-dimensional cylindrical coordinate system, (x, y, z) in a Cartesian coordinate system of 3D space, (y, θ, z) in a cylindrical coordinate system of 3D space, or (y, θ, φ) of a spherical coordinate system.

Attribute information may be a vector (R, G, B) indicating the color of a point, or/and a vector of values obtained from one or more sensors, such as a brightness value, or/and a reflection coefficient of a LiDAR, or/and a temperature value obtained from a thermal imaging camera.

The PCC data may be provided to the encoder as input and encoded to generate a geometry information bitstream and an attribute information bitstream as output.

The encoded geometry information bitstream and the attribute information bitstream may be provided to the decoder as input and decoded to generate reconstructed PCC data as output.

The attribute information predictor (see FIG. 23) may be included in the attribute information encoder of the encoder and the attribute information decoder of the decoder.

A spatial partitioner 20000 may receive PCC data including geometry data and attribute data, and partition the space into predetermined units. The spatial partitioner 20000 may be referred to as a spatial partitioning device.

For example, the spatial partitioner 20000 may partition the input PCC data into at least one 3D block. Here, a block may represent a tile group, a tile, a slice, a coding unit (CU), a prediction unit (PU), or a transform unit (TU). Partitioning may be performed based on at least one of an octree, a quadtree, a binary tree, a triple tree, or a k-d tree. Alternatively, the data may be partitioned into blocks of predetermined width and height. Alternatively, partitioning may be performed by selectively determining various positions and sizes of blocks. The corresponding information may be entropy-encoded and transmitted to the decoder.

A geometry information encoder 20010 may encode the geometry data. The geometry information encoder 20010 may be referred to as a geometry information encoding unit.

For example, the geometry information encoder 20010 generates an encoded geometry information bitstream by encoding the geometry information received as input and generates reconstructed geometry information by reconstructing the geometry information. The generated bitstream may be transmitted to the PCC decoder. In addition, the generated reconstructed geometry information may be input to the attribute information encoder. Details of the configuration of the geometry information encoder 20010 are shown in FIG. 28.

An attribute information encoder 20020 may encode the attribute data. The attribute information encoder 20020 may be referred to as an attribute information encoding unit.

For example, the attribute information encoder 20020 generates an attribute information bitstream by encoding the attribute information received as input. The generated attribute information bitstream may be transmitted to the PCC decoder. Details of the configuration of the attribute information encoder 20020 are shown in FIG. 21.

A spatial partitioner 20030 may receive the point cloud bitstream (see FIG. 24) and partition the space from the geometry information bitstream. The spatial partitioner 20030 may be referred to as a spatial partitioning device.

For example, the spatial partitioner 20030 may partition the space based on partioning information provided by the encoder or derived by the decoder.

A geometry information decoder 20040 may decode the geometry data. The geometry information decoder 20040 may be referred to as a geometry information decoding unit.

For example, the geometry information decoder 20040 reconstructs the geometry information by decoding the geometry information bitstream received as input. The reconstructed geometry information may be input to an attribute information decoder.

The attribute information decoder 20050 may decode attribute data.

For example, the attribute information decoder 20050 reconstructs the attribute information based on the received attribute information bitstream and the reconstructed geometry information received from the geometry information decoder as input. The reconstructed attribute information and the reconstructed geometry information may constitute reconstructed PCC data. Details of the configuration of the attribute information decoder 20050 are shown in FIG. 22. The attribute information decoder 20050 may be referred to as an attribute information decoding unit.

FIG. 21 shows an attribute information encoding unit according to embodiments.

FIG. 21 corresponds to the attribute information encoder 20020 of FIG. 20.

An attribute information transformer 21000 may transform characteristics of attribute data.

For example, the attribute information transformer 21000 may transform the characteristics of the received attribute information. For example, when the attribute information includes color information, the attribute information transformer may transform the color space of the attribute information. The transformed attribute information may be input to a geometry information mapper. Alternatively, the attribute information may be input to the geometry information mapper without being transformed.

The geometry information mapper 21010 may receive the reconstructed geometry data and map the attribute data to the reconstructed geometry data.

For example, the geometry information mapper 21010 reconstructs attribute information by mapping the attribute information received from the attribute information transformer 21000 as input to the received reconstructed geometry information. In reconstructing the attribute information, attribute values may be derived based on the attribute information about one or more points based on the reconstructed geometry information. A difference between the reconstructed attribute information and the predicted attribute information generated by the attribute information predictor may be estimated and input to a residual attribute information transformer.

A filter 21020 may filter the attribute data.

For example, the filter 21020 may include a deblocking filter, an offset corrector, and an adaptive loop filter (ALF). The filter may filter the reconstructed attribute information. Filtering may be performed on the geometry information (XYZ) instead of the attribute information (RGB, etc.), and the same filtering algorithm may be used based on a different input.

A memory 21030 may store the attribute data.

For example, the memory 21030 may store the attribute information computed through the filter 21020. The stored attribute information may be provided to an attribute information predictor when prediction is performed.

The attribute information predictor 21040 may generate predicted attribute data for entropy encoding of a predicted value.

For example, the attribute information predictor 21040 generates predicted attribute information based on the attribute information about the points in the memory. The predicted information may be encoded by entropy encoding. Details of the configuration of the attribute information predictor 21040 are shown in FIG. 23.

The residual attribute information transformer 21050 may transform a residual value (residual attribute information) generated based on a difference between the attribute information and the predicted value of the attribute information.

For example, the residual attribute information transformer 21050 may transform a 3D residual block including the received residual attribute information using a transform type such as DCT, DST, DST, SADCT, or RAHT. The transformed residual attribute information may be input to a residual attribute information quantizer. Alternatively, the residual attribute information may be input to the residual attribute information quantizer without being transformed. The transform type may be entropy-encoded by the entropy encoder and transmitted to the decoder.

The residual attribute information quantizer 21060 may quantize the residual attribute information.

For example, the residual attribute information quantizer 21060 generates transformed and quantized residual attribute information based on a quantization value of the received transformed residual attribute information. The transformed and quantized residual attribute information may be input to an attribute information entropy encoder and a residual attribute inverse quantizer.

Data transmitted through attribute information encoding may include five parameters (parameter set) related to the encoded value of the attribute residual value and the index difference from the current point.

The attribute information entropy encoder 21070 may encode the attribute information or the residual attribute information based on the entropy scheme.

For example, the attribute information entropy encoder 21070 may receive the transformed and quantized residual attribute information and perform entropy encoding thereon. For entropy encoding, various encoding methods such as Exponential Golomb, Context-Adaptive Variable Length Coding (CAVLC), and Context-Adaptive Binary Arithmetic Coding (CABAC) may be used.

The residual attribute information inverse quantizer 21080 may inversely generate residual attribute information from the quantized attribute information.

For example, the residual attribute information inverse quantizer 21080 receives the transformed and quantized residual attribute information and generates transformed residual attribute information based on a quantization value. The generated transformed residual attribute information may be input to a residual attribute inverse transformer.

The residual attribute information inverse transformer 21090 may inversely transform the residual attribute information.

For example, the residual attribute information inverse transformer 21090 may inversely transform the 3D residual block including the received transformed residual attribute information, using a transform type such as DCT, DST, DST, SADCT, RAHT, or the like. The inversely transformed residual attribute information may be combined with the predicted attribute information received as input from the attribute information predictor to generate reconstructed attribute information. Alternatively, the reconstructed attribute information may be generated by adding the residual attribute information directly to the predicted attribute information without inversely transforming the residual attribute information.

FIG. 22 shows an attribute information decoding unit according to embodiments.

FIG. 22 corresponds to the attribute information decoder 20050 of FIG. 20.

The operation of the attribute information decoder may follow the reverse of the operation of the attribute information encoder of FIG. 21.

The attribute information entropy decoder 22000 may receive an attribute information bitstream and decode the attribute information based on the entropy scheme.

For example, the attribute information entropy decoder 22000 may generate transformed and quantized attribute information by entropy-decoding the received attribute information bitstream. The generated transformed and quantized attribute information may be input to the geometry information mapper.

The data received by the attribute information decoder may include the encoded attribute residual information and five parameters included in a parameter set and related to an index difference from the current point.

The geometry information mapper 22010 may map the reconstructed geometry data to the decoded attribute data.

For example, the geometry information mapper 22010 maps the transformed and quantized attribute information received from the attribute information entropy decoder to the received reconstructed geometry information. The attribute information mapped to the geometry information may be input to a residual attribute information inverse quantizer.

The residual attribute information inverse quantizer 22020 may inversely quantize the attribute information or the residual attribute information.

For example, the residual attribute information inverse quantizer 22020 inversely quantizes the received transformed and quantized attribute information based on a quantization value. The inversely quantized transformed residual attribute information may be input to a residual attribute information inverse transformer.

The residual attribute information inverse transformer 22030 may inversely transform the attribute information or the residual attribute information.

For example, the residual attribute information inverse transformer 22030 may inversely transform the 3D residual block including the received transformed residual attribute information using a transform type such as DCT, DST, DST, SADCT, or RAHT. The inversely transformed residual attribute information may be combined with the predicted attribute information generated by the attribute information predictor and stored in the memory. Alternatively, the residual attribute information may be combined with the predicted attribute information without performing inverse transformation, and be then stored in the memory.

A filter 22050 may filter the attribute information or the residual attribute information.

The attribute information predictor 22040 may generate a predicted value (predicted attribute information) for the attribute information.

For example, the attribute information predictor 22040 generates predicted attribute information based on the attribute information about the points in the memory. The predicted information may be obtained by performing entropy decoding.

An attribute information inverse transformer 22070 may inversely transform the attribute information.

For example, the attribute information inverse transformer 22070 may receive the type of the attribute information and transformation information from the entropy decoder and perform various color space inverse transformations such as RGB-YUV and RGB-YUV.

FIG. 23 shows an attribute information prediction unit according to embodiments.

FIG. 23 corresponds to the attribute information predictors 20020, 20050, 21040, and 22040 shown in FIGS. 20 to 22.

The attribute predictor (or attribute predicting device) may include an LOD configurator 23000, a neighbor set configurator 23010, a prediction transform/inverse transform unit 23020, and/or a lifting transform/inverse transform unit 23030.

The LOD configurator 23000 may receive attribute information and/or reconstructed geometry information and generate an LOD (see FIGS. 4, 8 and 9).

The neighbor set configurator 23010 may generate a neighbor point set for attribute information prediction. The neighbor set configurator 23010 may be included in the attribute information predictor, and may be included in both the transmitting terminal and the receiving terminal.

For example, the neighbor set configurator 23010 may have a neighbor search range configuration method (neighbor_search_range_type). A range in which a neighbor point is to be searched for may be configured according to the selected method, and the applied method may be transmitted to the decoder (see FIG. 24 to 27). The neighbor search range configuration method may include Morton code-based search range configuration and octree-based search range configuration.

The neighbor set configurator 23010 may have a neighbor search range (neighbor_search_range). A range in which a neighbor point is to be searched for may be configured according to a neighbor search range configuration method. The search range may be configured for each LOD (neighbor_search_range[idx]) (see FIGS. 24 to 27), and may be changed at a specific rate for each LOD (neighbor search_range_rate_per_lod) (see FIGS. 24 to 27).

The neighbor set configurator 23010 may have a neighbor point selection method (neighbor_selection_type), and select a neighbor point according to the selection method. The applied method may be transmitted to the decoder. The neighbor point selection method may include a distance-based method, an attribute-based method, and a method based on both the distance and attributes.

When selecting a neighbor point using the attribute-based method or the method based on both the distance and the attribute (distance+attribute-based method), the neighbor set configurator 23010 may have an attribute similarity measurement method (neighbor_attr_difference_method). It may select a neighbor point by measuring attribute similarity between points according to the selected method. The applied method may be transmitted to the decoder. The attribute similarity measurement method may include Euclidean Color Distance, Correlated Color Temperature, and CIE94 (see FIG. 16).

When selecting a neighbor point using the attribute-based method or the distance+attribute-based method, the neighbor set configurator 23010 may have a minimum attribute similarity threshold (or a maximum attribute difference threshold) (neighbor_attr_min_similarity_threshold) of a neighbor point (see FIG. 24 to 27). It may register the point as a neighbor node only when the similarity is greater than neighbor_attr_min_similarity_threshold. The threshold may be transmitted to the decoder.

When a neighbor point is selected using the distance+attribute-based method, the neighbor set configurator 23010 may have neighbor_attr_1st_phase_num_of_Points related to the number of neighbor points primarily selected based on the distance, which may be transmitted to the decoder.

For other operations of the neighbor set configurator, refer to the descriptions given above.

The prediction transform/inverse transform unit 23020 may perform prediction transform encoding or decoding. As described above, the encoder may perform prediction transform coding for configuring a predicted attribute (or predicted attribute value) of each point by generating predictors for points. That is, N predictors may be generated for N points. The predictor according to the embodiments may calculate a weight (=1/distance) based on the LOD value of each point, indexing information about neighbor points present within a distance set for each LOD, and distances to the neighbor points.

The predicted attribute (or attribute value) according to the embodiments is set as the average of the values obtained by multiplying the attributes (or attribute values (e.g., color, reflectance, etc.)) of neighbor points configured in the predictor of each point by a weight (or weight value) calculated based on the distance to each neighbor point. The point cloud encoder (e.g., the coefficient quantizer 40011) according to the embodiments may quantize and inversely quantize residuals (which may be referred to as residual attributes, residual attribute values, attribute prediction residuals) obtained by subtracting the predicted attribute (attribute value) from the attribute (attribute value) of each point.

Also, the prediction transform encoding and decoding may be performed according to the embodiments described with reference to FIG. 15 and the like.

The lifting transform/inverse transform unit 23030 may perform lifting transform encoding and decoding. In this operation, which is similar to the above-described prediction transform coding, weights may be cumulatively applied to attribute values. For details of the lifting transform/inverse transform, refer to the description of lifting transform of the above-described embodiments.

Figure 24:
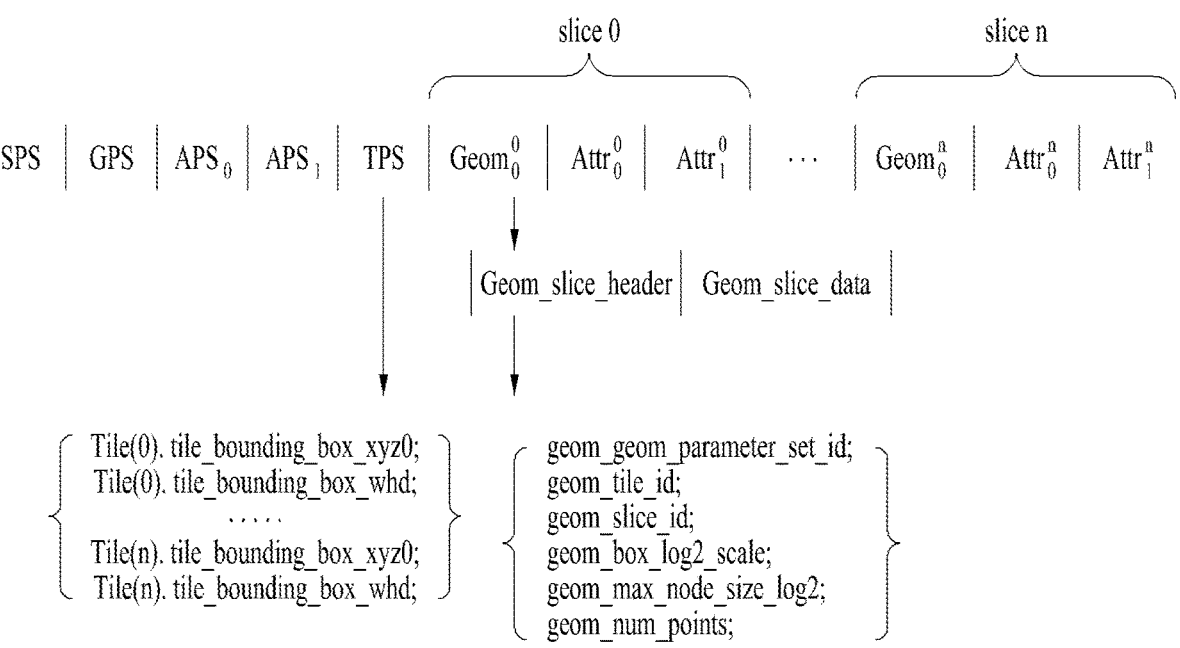
FIG. 24 shows a configuration of a point cloud bitstream according to embodiments.

FIG. 24 shows a configuration of a point cloud bitstream according to embodiments.

The bitstream shown in FIG. 24 may be generated by the transmission device 1000, the point cloud video encoder 10002 of FIG. 1, the encoding 20001 of FIG. 2, the encoder of FIG. 4, the transmission device of FIG. 12, the XR device 1430 of FIG. 14, the PCC encoder of FIG. 20, the attribute information encoder of FIG. 21, the attribute information predictor of FIG. 23, the geometry information encoder of FIG. 28, the attribute information encoder of FIG. 29, and the like, and may be received by the reception device of FIG. 1, the decoding 20003 of FIG. 2, the decoder of FIGS. 10 and 11, the reception device of FIG. 13, the XR device 1430 of FIG. 14, the PCC decoder of FIG. 20, the attribute information decoder of FIG. 22, the attribute information predictor of FIG. 23, the geometry information decoder of FIG. 30, the attribute information decoder of FIG. 31, and the like.

The following abbreviations are used in the present disclosure: SPS (Sequence Parameter Set); GPS (Geometry Parameter Set); APS (Attribute Parameter Set); TPS (Tile Parameter Set); Geom (Geometry bitstream (=geometry slice header+geometry slice data)); Attr (Attribute bitstream (=attribute brick header+attribute brick data)). Here, the brick may be referred to as a block or the like.

The point cloud data according to the embodiments may take the form of a bitstream as shown in FIG. 24. The point cloud data may contain a sequence parameter set (SPS), a geometry parameter set (GPS), an attribute parameter set (APS), and a tile parameter set (TPS) containing signaling information according to embodiments. The point cloud data may contain one or more geometries and/or attributes. The geometry and/or attributes in the point cloud data may be divided into one or more slices (or bricks/blocks). The geometry may have a structure of a geometry slice header and geometry slice data. For example, the TPS containing signaling information may include Tile(0)_tile_bounding_box_xyz0 and Tile(0)_tile_bounding_box_whd. The geometry may include geom_geom_parameter_set_id, geom_tile_id, geom_slice_id, geomBoxOrigin, geom_box_log 2_scale, geom_max_node_size_log 2, and geom_num_points.

The signaling information according to the embodiments may be added to the SPS, GPS, APS, TPS, or the like and signaled.

According to embodiments, the signaling information may be added to the TPS, the slice header of Geom for each slice, or the slice header of Attr for each slice and signaled.

The structure of the point cloud data according to the embodiments may efficiently provide parameter set(s), geometry(s), and attribute(s) including signaling information in terms of encoding/decoding/data.

The point cloud data related to the point cloud data transmission/reception device according to the embodiments may contain at least one of a sequence parameter, a geometry parameter, an attribute parameter, a tile parameter, a geometry bitstream, or an attribute bitstream.

Hereinafter, syntax of specific signaling information will be described with reference to the drawings. For reference, the name of the signaling information according to the embodiments may be changed/extended within the intended meaning/function range of the signaling information. The field of signaling information may be distinguishably referred to as first signaling information, second signaling information, or the like.

As described above, the point cloud data transmission device (for example, the point cloud data transmission device described with reference to FIGS. 1, 11, 14 and 1) may transmit encoded point cloud data in the form of a bitstream. According to embodiments, the bitstream may include one or more sub-bitstreams.

A slice may be a partitioning unit of point cloud data, and may be a unit of encoding/decoding. Accordingly, the point cloud bitstream may include geometry data and attribute data for each slice.

Information for embodiments may be signaled.

The point cloud data transmission device (e.g., the point cloud data transmission device described in FIGS. 1, 4, 12 and 14) may divide an image of the point cloud data into one or more packets in consideration of the error of the transmission channel, and transmit the same over the network. According to embodiments, the bitstream may include one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device may perform point cloud compression coding with better compression efficiency and appropriate latency on data corresponding to a region important to a user.

An image (or picture) of point cloud content according to embodiments is partitioned into basic processing units for point cloud compression coding. The basic processing unit for point cloud compression coding according to the embodiments may include a coding tree unit (CTU) and a brick, but is not limited to this example.

A slice according to embodiments is a region including basic processing units for one or more point cloud compression codings, and does not have a rectangular shape. The slice according to the embodiments contains data transmitted through a packet A tile according to embodiments is a region partitioned in a rectangular shape in the image and includes basic processing units for one or more point cloud compression codings. One slice according to embodiments may be included in one or more tiles. Also, one tile according to embodiments may be included in one or more slices.

According to embodiments, a bitstream may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and one or more slices.

The SPS according to the embodiments may be encoding information for an entire sequence such as a profile and a level, and may include comprehensive information about the entire file, such as picture resolution and video format.

One slice according to embodiments (e.g., slice 0) contains a slice header and slice data. The slice data may include one geometry bitstream Geom00 and one or more attribute bitstreams Attr00 and Attr10. The geometry bitstream may contain a header (e.g. geometry slice header) and a payload (e.g. geometry slice data). The header of the geometry bitstream according to the embodiments may contain identification information (geom_geom_parameter_set_id) about a parameter set included in the GPS, a tile identifier (geom_tile_id), slice identifier (geom_slice_id), origin information about a geometry box (geomBoxOrigin), a geometry box scale (geom_box_log 2_scale), a max geometry node size (geom_max_node_size_log 2), the number of geometry points (geom_num_poins), and information about data contained in the payload. The attribute bitstream may contain a header (e.g. an attribute slice header or an attribute brick header) and a payload (e.g., attribute slice data or attribute brick data).

The method/device according to the embodiments may add, to the SPS, geometry quantization option information according to the embodiments in the point cloud bitstream to the SPS and signal the same. The geometry quantization option information for each axis according to the embodiments may be added to the GPS and signaled. The SPS may maintain the scale value (quantization value) applied as a whole, and the GPS may set a scale value (quantization value) which is fine-tuned for each axis.

When quantization is performed differently for each tile, geometry quantization option information for each axis according to embodiments may be added to the TPS and signaled. The geometry distribution may differ among the tiles divided by region. Accordingly, when a geometry quantization value (scale value) for each axis is set according to the distribution, or the quantization value for each axis is readjusted according to the percentage of each axis to one quantization value, geometry quantization for each axis may be performed differently for each tile.

Related information may be signaled to implement embodiments. Signaling information according to embodiments may be used at the transmitting side or the receiving side.

Geometry data (Geom): Geometry bitstream=geometry slice header+geometry slice data Attribute data (Attr): Attribute bitstream=attribute brick header+attribute brick data. A brick may correspond to a slice.

The transmission method/device according to the embodiments may add, to the SPS or APS, attribute point configuration related information for the spatial scalability function of the attribute encoding/decoding operation and signal the same.

The transmission method/device according to the embodiments may add, to the TPS or Attr for each slice, attribute point configuration related information for the spatial scalability function of the attribute encoding/decoding operation and signal the same.

Tiles or slices are provided to and process the point cloud according to embodiments by partitioning the same into regions. That is, the point cloud data may be partitioned into regions, wherein the unit of partition may be a tile and/or a slice.

In dividing the point cloud data into regions, an option of generating a different neighbor point set for each region may be set, such that low complexity is obtained although the reliability of the result is somewhat low, or that high reliability is obtained although the complexity is high. This may be set differently according to the processing capacity of the receiver.

When a point cloud is divided into tiles, different processing options for overlapping point may be applied to the respective tiles.

When the point cloud is divided into slices, different processing options for overlapping point may be applied to the respective slices.

Attribute slice data may be changed and signaled according to an option related to prediction mode processing.

Option information related to neighbor set generation and prediction/lifting transform may be added to the APS and signaled.

Accordingly, when the point cloud is divided into tiles, a different neighbor set generation option may be applied to each tile.

When the point cloud is divided into slices, a different neighbor set generation option may be applied to each slice.

The option information related to neighbor set generation and prediction/lifting transform may be added to the TPS or to Attr for each slice and signaled.

FIGS. 25 to 27 show detailed syntax of signaling information contained in the bitstream of the point cloud data in FIG. 24. To support the operation according to the embodiments, the transmission device and the reception device according to the embodiments may provide a signaling scheme as described below.

FIG. 25 shows an attribute parameter set (APS) (attribute_parameter_set) according to embodiments.

FIG. 25 shows the APS of FIG. 24.

The method/device according to the embodiments may add the neighbor set and prediction/lifting transform related option information to the APS and signal the same. The method/device may signal and access the neighbor set and prediction/lifting transform related option information based on an attribute.

neighbor_search_range_type indicates a neighbor search range configuration method. For example, when the value of this information is 1, it indicates Morton code-based search range configuration. when the value of this information is 2, it indicates octree-based search range configuration. Each integer value may be changed according to embodiments.

neighbor_selection_type indicates a neighbor point selection method. For example, when the value of this information is 1, it indicates distance-based neighbor point selection. When the value of this information is 2, it indicates attribute-based neighbor point selection. when the value of this information is 3, it indicates distance+attribute-based neighbor point selection. Each integer value may be changed according to embodiments.

neighbor_search_range indicates the number of neighbor points to the left and right in the list according to the neighbor search range configuration method, or the level difference of the upper parent node for search range configuration in the octree (see FIGS. 17 and 18).

neighbor_search_range_rate_per_lod indicates the percentage of the range that is changed as the LOD is lowered.

When neighbor_selection_type is greater than 1, that is, when attribute-based neighbor point selection and/or distance+attribute-based neighbor point selection are applied, the following elements may be signaled.

neighbor_attr_different_method indicates a method of measuring attribute similarity. For example, when the value of this information is 1, it indicates Euclidian color distance. When the value of this information is 2, it indicates Correlated Color Temperature. When the value of this information is 3, it indicates CIE94 (see FIG. 16). Each integer value may be changed according to embodiments.

neighbor_attr_min_similarity_threshold indicates the minimum attribute similarity threshold for a neighbor point.

When neighbor selection_type is 3, that is, when distance+attribute-based neighbor point selection is applied, the following elements may be signaled.

neighbor_attr_1st_phase_num_of_points indicates the number of neighbor points that are primarily selected based on distance in the first phase in selecting a neighbor point using the distance+attribute-based method.

sig_flag indicates the sign of the index difference value. When the value of this information is 0, the index difference value may be negative. When the value of this information is 1, the index difference value may be positive. Alternatively, the values may indicate the opposite cases according to embodiments.

First flag (gt1_flag) indicates 1 when the absolute value of the index difference to be transmitted after a neighbor node having a similar attribute is selected is greater than 1, and indicates 0 when the absolute value is less than 1.

Second flag (gt3_flag) indicates 1 when the absolute value of the index difference to be transmitted after a neighbor node having a similar attribute is selected is greater than 3, and indicates 0 when the absolute value is less than 1.

parity_flag indicates the parity of the absolute value of the index difference after a neighbor node having a similar attribute is selected.

When the value of the second flag (gt3_flag) is 1, remain_data may be binarized through Golomb-Rice coding and transmitted to the decoder through arithmetic coding. When the value is 0, remain_data is directly coded and transmitted to the decoder.

For example, suppose that there are points 1 to N (sorted in Morton order). Point 2 may be delivered as a parameter set (five parameters: sig_flag, gt1_flag, gt3_flag, parity_flag, and remain_data) based on point 1. Point 3 may be selected as a neighbor of one of points 1 and 2 according to the attribute similarity equations (Euclidean distance calculation, etc.) in FIG. 16 according to embodiments, and one corresponding parameter set may be transmitted.

That is, in performing attribute-based encoding, one parameter set (five parameters: sig_flag, gt1_flag, gt3_flag, parity_flag, remain_data) may be provided per point. The attribute difference calculation method may be used to find the one most similar attribute value. The method/device according to the embodiments may restore the attribute by applying the same index difference value to multiple points.

For N points sorted based on the Morton code, the index of the first point may always be 0 because the index difference from a similar attribute point is transmitted. Offsets may be calculated with indices from 0 to N assigned to the N points that are sorted in Morton order.

aps_attr_parameter_set_id provides an identifier for the APS for reference by other syntax elements. The value of aps_attr_parameter_set_id shall be in the range of 0 to 15, inclusive.

aps_seq_parameter_set_id specifies the value of sps_seq_parameter_set_id for the active SPS. The value of aps_seq_parameter_set_id shall be in the range of 0 to 15, inclusive.

attr_coding_type indicates the coding type for the attribute. The value of attr_coding_type may be 0, 1, or 2. Other values of attr_coding_type are reserved for future use by ISO/IEC. Decoders conforming to this version of this specification shall ignore reserved values of attr_coding_type.

0=Predicting weight lifting, 1=Region Adaptive Hierarchical Transferm (RAHT), 2=Fixed weight lifting.

When attr_coding_type is 0 or 2, isLifting may be 1. Otherwise, it may be 0.

When isLifting is 1, the following elements may be signaled.

num_pred_nearest_neighbours specifies the maximum number of nearest neighbors to be used for prediction. The value of numberOfNearestNeighboursInPrediction shall be in the range of 1 to xx.

max_num_direct_predictors specifies the maximum number of predictor to be used for direct prediction. The value of max_num_direct_predictors shall be in the range of 0 to num_pred_nearest_neighbours. The value of the variable MaxNumPredictors that is used in the decoding operation as follows: MaxNumPredictors=max_num_direct_predicots+1.

lifting_search_range specifies a search range for the lifting.

lifting_quant_step_size specifies the quantization step size for the 1st component of the attribute. The value of quant_step_size shall be in the range of 1 to xx.

lifting_quant_step_size_chroma specifies the quantization step size for the chroma component of the attribute when the attribute is color. The value of quant_step_size_chroma shall be in the range of 1 to xx.

lod_binary_tree_enabled_flag specifies whether binary tree is enabled or not for the log generation.

num_detail_levels_minus1 specifies the number of levels of detail (LODs) for attribute coding. The value of num_detail_levels_minus1 may be in the range of 0 to XX.

According to num_detail_levels_minus1, the following elements may be signaled for each index.

sampling_distance_squared [idx] specifies the square of the sampling distance for idx. The value of sampling_distance_squared[ ] shall be in the range of 0 to xx.

When attr_coding_type is 0, that is, when the attribute coding type is predicting lifting, the following elements may be signaled.

adaptive_prediction_threshold specifies the threshold of prediction.

When attr_coding_type is 1, that is, when the attribute coding type is RAHT, the following elements may be signaled.

raht_depth specifies the number of levels of detail for RAHT. The value of depthRAHT shall be in the range of 1 to xx.

raht_binarylevel_threshold specifies the levels of detail to cut out the RAHT coefficient. The value of binaryLevelThresholdRAHT shall be in the range of 0 to xx.

raht_quant_step_size specifies the quantization step size for the 1st component of the attribute. The value of quant_step_size shall be in the range of 1 to xx.

aps_extension_present_flag equal to 1 specifies that the aps_extension_data syntax structure is present in the APS RBSP syntax structure. aps_extension_present_flag equal to 0 specifies that this syntax structure is not present. When not present, the value of aps_extension_present_flag may be inferred to be equal to 0.

aps_extension_data flag may have any value. Its presence and value may not affect decoders conforming to a profile.

FIG. 26 shows a tile parameter set (TPS) (tile_parameter_set) according to embodiments.

FIG. 26 shows the TPS of FIG. 24.

The method/device according to the embodiments may add the neighbor set and prediction/lifting transform related option information to the TPS and signal the same. It may signal the neighbor set and prediction/lifting transform related option information for each tile. The reception method/device may access the neighbor set and prediction/lifting transform related option information for each tile.

num_tiles specifies the number of tiles signaled for the bitstream. When not present, num_tiles may be inferred to be 0.

tile_bounding_box_offset_x[i] indicates the x offset of the i-th tile in the Cartesian coordinates. When not present, the value of tile_bounding_box_offset_x[0] may be inferred to be sps_bounding_box_offset_x.

tile_bounding_box_offset_y[i] indicates the y offset of the i-th tile in the Cartesian coordinates. When not present, the value of tile_bounding_box_offset_y[0] may be inferred to be sps_bounding_box_offset_y.

tile_bounding_box_offset_z[i] indicates the z offset of the i-th tile in the Cartesian coordinates. When not present, the value of tile_bounding_box_offset_z[0] may be inferred to be sps_bounding_box_offset_z.

tile_bounding_box_scale_factor[i] indicates the scale factor the i-th tile in the Cartesian coordinates. When not present, the value of tile_bounding_box_scale_factor[0] may be inferred to be sps_bounding_box_scale_factor.

tile_bounding_box_size_width[i] indicates the width of the i-th tile in the Cartesian coordinates. When not present, the value of tile_bounding_box_size_width[0] may be inferred to be sps_bounding_box_size_width.

tile_bounding_box_size_height[i] indicates the height of the i-th tile in the Cartesian coordinates. When not present, the value of tile_bounding_box_size_height[0] may be inferred to be sps_bounding_box_size_height.

tile_bounding_box_size_depth[i] indicates the depth of the i-th tile in the Cartesian coordinates. When not present, the value of tile_bounding_box_size_depth[0] may be inferred to be sps_bounding_box_size_depth.

For definition of neighbour_search_range_type, neighbour_selection_type, neighbour search_range_rate_period, neighbour_attr_different_method, neighbour attr_min_similarity_threshold, neighbour_attr_1st_phase_num_of_points, neighbour_search_range[idx], sig_flag, gt1_flag, partity_flag, gt3_flag, and remain_data according to the embodiments, reference may be made to the description of FIG. 25.

FIG. 27 shows an attribute slice header (ASH) (attribute_slice_header) according to embodiments.

FIG. 27 shows the slice header of attribute data included in the slice of FIG. 24.

The method/device according to the embodiments may add the option information related to neighbor set generation and prediction/lifting transform to a slice header of attribute data (Attr) and signal the same. The method/device according to the embodiments may signal the option information related to neighbor set generation and prediction/lifting transform in the header of an attribute for each slice, and the reception device may access the attribute_slice_header.

abh_attr_parameter_set_id specifies the value of aps_attr_parameter_set_id of the active APS.

abh_attr_sps_attr_idx specifies the attribute set in the active SPS. The value of abh_attr_sps_attr_idx shall be in the range of 0 to sps_num_attribute_sets in the active SPS.

abh_attr_geom_slice_id specifies the value of geom slice id.

For definition of neighbour_search_range_type, neighbour_selection_type, neighbour search_range_rate_per_lod, neighbour_attr_different_method, neighbour_attr_min_similarity_threshold, neighbour_attr_1st_phase_num_of_points, neighbour_search_range[idx], sig_flag, gt1_flag, partity_flag, gt3_flag, and remain_data according to the embodiments, reference may be made to the description of FIG. 25.

FIG. 28 shows a geometry encoder according to embodiments.

The geometry encoder of FIG. 28 may be included in the point cloud video encoder 10002 of FIG. 1, the encoding 20001 of FIG. 2, the encoder of FIG. 4, the transmission device of FIG. 12, the XR device 1430 of FIG. 14, and the like. It may correspond to the geometry information encoder 20010 of FIG. 20.

The geometry information encoder may include a coordinate transformer 28000, a geometry information transform/quantization unit 28010, a residual geometry information quantizer 28020, a geometry information entropy encoder 28030, a residual geometry information inverse quantizer 28040, a memory 28060, and a geometry information predictor 28070.

The PCC encoder may include a geometry information encoder and an attribute information encoder. The geometry information encoder may generate a geometry information bitstream and restored (reconstructed) geometry information by performing the following process.

The coordinate transformer 40000 corresponds to the coordinate transformer 28000 of the geometry information encoder, and a combination of the quantization processor 40001, 12001, the voxelization processor 40001, 12002, the octree code generator 40002, 12003, and the surface model processor 40003, 12004 corresponds to the geometry information transform/quantization unit 28010. The intra/inter-coding processor 12005 corresponds to the geometry information predictor 28070, and the arithmetic coder 12006 corresponds to the geometry information entropy encoder 28030.

The coordinate transformer 28000 may transform the coordinates of geometry information. The coordinate transformer 28000 may receive geometry information as input and transform the same into a coordinate system different from the existing coordinate system. Alternatively, it may skip coordinate transformation. The coordinate-transformed geometry information may be input to the geometry information transform/quantization unit.

Information about whether to perform coordinate transform and the coordinate information may be signaled in a unit such as sequence, frame, tile, slice, block, or the like. Alternatively, it may be derived based on whether to transform the coordinates of a neighbor block, the block size, the number of points, the quantization value, the block partitioning depth, the position of the unit, the distance between the unit and the origin, and the like.

When coordinate transformation is to be transformed as a result of checking whether to perform coordinate transformation, the coordinate information may be signaled in a unit of sequence, frame, tile, slice, block, or the like. Alternatively, it may be derived based on whether to transform the coordinates of a neighbor block, the block size, the number of points, the quantization value, the block partitioning depth, the position of the unit, the distance between the unit and the origin, and the like.

The geometry information transform/quantization unit 28000 may transform the geometry information and quantize the same based on an octree. The geometry information transform/quantization unit 28000 receives geometry information as an input, applies one or more transform techniques such as positional transformation and/or rotational transformation thereto, and quantizes the geometry information by dividing the geometry information by a quantization value to generate transformed and quantized geometry information.

The transformed and quantized geometry information may be input to the geometry information entropy encoder and the residual geometry information quantizer.

The residual geometry information quantizer 28000 may predict the geometry information and quantize residual geometry information generated by subtracting a predicted value. The residual geometry information quantizer 28000 receives residual geometry information obtained by subtraction between the transformed and quantized geometry information and the predicted geometry information as input, and quantizes the same into a quantization value to generate quantized residual geometry information. The quantized residual geometry information may be input to the geometry information entropy encoder and the residual geometry information inverse quantizer.

The geometry information entropy encoder 28000 may encode the geometry information or a residual value of the geometry information based on the entropy scheme. The geometry information entropy encoder 28000 may receive the quantized residual geometry information as input and perform entropy encoding thereon. For entropy encoding, various encoding methods such as Exponential Golomb, Context-Adaptive Variable Length Coding (CAVLC), and Context-Adaptive Binary Arithmetic Coding (CABAC) may be used. A geometry information bitstream may be generated.

The residual geometry information inverse quantizer 28000 may perform inverse quantization to reconstruct the residual geometry information. The residual geometry information inverse quantizer 28000 receives the quantized residual geometry information and scales the same with a quantization value to reconstruct the residual geometry information. The reconstruct residual geometry information may be added to the predicted geometry information to reconstruct geometry information and store the same in the memory.

The filter 28000 may filter the reconstructed (restored) geometry information. The filter 28000 may perform filtering on the reconstructed geometry information. The filter may include a deblocking filter, an offset corrector, and an ALF.

The memory 28000 may store the geometry information calculated through the filter. The stored geometry information may be provided to the geometry information predictor when prediction is performed.

The geometry information predictor 28000 may generate a predicted value of the geometry information in order to efficiently compress the geometry information. The geometry information predictor 28000 generates predicted geometry information by predicting the geometry information based on the geometry information about points in the memory. The prediction information used for prediction may be encoded by entropy encoding.

FIG. 29 shows an attribute information encoder according to embodiments.

The attribute information encoder of FIG. 29 may be included in the point cloud video encoder 10002 of FIG. 1, the encoding 20001 of FIG. 2, the encoder of FIG. 4, the transmission device of FIG. 12, the XR device 1430 of FIG. 14, and the like, and may correspond to the attribute information encoder 20020 of FIG. 20. FIG. 29 schematically illustrates the attribute information encoder of FIG. 21. Depending on the coding type for attribute information, residual attribute information may be encoded by predicting the attribute information, or attribute information may be encoded without prediction.

The PCC encoder may include a geometry information encoder and an attribute information encoder. The attribute information encoder may generate an attribute information bitstream by performing the operations described below.

The attribute information encoder may include an attribute characteristic transformer 29000, a geometry information mapper 29010, an attribute information transformer 29020, an attribute information quantizer 29030, an attribute information entropy encoder 29040, an inverse quantizer, a memory, and an attribute information predictor.

The color transform processor 12008 corresponds to the attribute information transformer 29000 of the attribute information encoder, and the attribute transform processor 12009 corresponds to the geometry information mapper 29010. The prediction/lifting/RAHT transform processor 120410 is divided into the attribute information predictor 21040, the residual attribute information transformer 21050, and the residual attribute information quantizer 21060. The arithmetic coder 12011 corresponds to the attribute information entropy encoder 29040.

The attribute characteristic transformer 29000 may transform the characteristic of attribute information. That is, it may transform the characteristic of the received attribute information. For example, when the attribute information includes color information, the attribute characteristic transformer may transform the color space of the attribute information. The transformed attribute information may be input to the geometry information mapper. Alternatively, the attribute information may be input to the geometry information mapper without being transformed.

The geometry information mapper 29010 may map the reconstructed geometry information to the attribute information. That is, the attribute information is reconstructed by mapping the attribute information received from the attribute information transformer and the received reconstructed geometry information. In reconstructing the attribute information, attribute values may be derived based on the attribute information about one or more points based on the reconstructed geometry information. A difference between the reconstructed attribute information and the predicted attribute information generated by the attribute information predictor may be estimated and input to the residual attribute information transformer.

The residual attribute information transformer may transform a 3D residual block including the received residual attribute information using a transform type such as DCT, DST, DST, SADCT, or RAHT. The transformed residual attribute information may be input to a residual attribute information quantizer. Alternatively, the residual attribute information may be input to the residual attribute information quantizer without being transformed. The transform type may be entropy-encoded by the entropy encoder and transmitted to the decoder.

The residual attribute information quantizer generates transformed and quantized residual attribute information based on the quantization value of the received transformed residual attribute information. The transformed and quantized residual attribute information may be input to an attribute information entropy encoder and a residual attribute inverse quantizer.

The attribute information entropy encoder may receive the transformed and quantized residual attribute information and perform entropy encoding thereon. For entropy encoding, various encoding methods such as Exponential Golomb, CAVLC, and CABAC may be used.

The attribute information transformer 29020 may transform the residual attribute information or transform the attribute information, like the residual attribute information transformer.

The attribute information quantizer 29030 may quantize the residual attribute information or quantize the attribute information, like the residual attribute information quantizer.

The residual attribute inverse quantizer receives the transformed and quantized residual attribute information and generates transformed residual attribute information based on the quantization value. The generated transformed residual attribute information may be input to a residual attribute inverse transformer.

The residual attribute inverse transformer may inversely transform the 3D residual block including the received transformed residual attribute information, using a transform type such as DCT, DST, DST, SADCT, RAHT, or the like. The inversely transformed residual attribute information may be combined with the predicted attribute information received as input from the attribute information predictor to generate reconstructed attribute information. Alternatively, the reconstructed attribute information may be generated by adding the residual attribute information directly to the predicted attribute information without inversely transforming the residual attribute information.

The filter may include a deblocking filter, an offset corrector, and an ALF. The filter may filter the reconstructed attribute information. Filtering may be performed on the geometry information (XYZ) instead of the attribute information (RGB, etc.), and the same filtering algorithm may be used based on a different input.

The memory may store the attribute information computed through the filter. The stored attribute information may be provided to an attribute information predictor when prediction is performed.

The attribute information predictor generates predicted attribute information based on the attribute information about the points in the memory. The predicted information may be encoded by entropy encoding.

The attribute information entropy encoder 29040 may encode the attribute information based on the entropy scheme. An attribute information bitstream may be generated.

FIG. 30 shows a geometry decoder according to embodiments.

The geometry decoder of FIG. 30 may be included in the point cloud decoder 10006 of FIG. 1, the decoding 20003 of FIG. 2, the decoder of FIGS. 10 and 11, the reception device of FIG. 13, the XR device 1430 of FIG. 13, the geometry information decoder 20040 of the PCC decoder of FIG. 13, and the like.

PCC decoding may be performed by the PCC decoder through the operations described below.

The PCC decoder may include a geometry information decoder and an attribute information decoder.

The spatial partitioner 20030 may partition the space based on partitioning information provided by the encoder or derived by the decoder.

The geometry information decoder 20040 reconstructs the geometry information by decoding the geometry information bitstream received as input. The reconstructed geometry information may be input to the attribute information decoder.

The attribute information decoder 20050 reconstructs the attribute information based on the received attribute information bitstream and the reconstructed geometry information received from the geometry information decoder as input. The reconstructed attribute information and the reconstructed geometry information may constitute reconstructed PCC data.

The PCC decoder may include a geometry information decoder and an attribute information decoder. The geometry information decoder may receive the encoded geometry information bitstream and reconstruct geometry information by performing the operations described below.

The geometry information decoder may include a geometry information entropy decoder 30000, a residual geometry information inverse quantizer 30010, a geometry information predictor 30020, and a coordinate inverse transformer 30040.

The arithmetic decoder 13002 corresponds to the geometry information entropy decoder 30000 of the geometry information decoder. The occupancy code-based octree reconstruction processor 13003, the a surface model processor 13004, and the inverse quantization processor 13005 correspond to the residual geometry information inverse quantizer 30010.

The geometry information entropy decoder 30000 may decode geometry information included in the received geometry information bitstream based on the entropy scheme. The geometry information entropy decoder 30000 may perform entropy decoding on the input bitstream. For example, for entropy decoding, various methods such as Exponential Golomb, CAVLC, and CABAC may be applied. The geometry information entropy decoder may decode information related to the geometry information prediction performed by the encoding device. The quantized residual geometry information generated through entropy decoding may be input to the residual geometry information inverse quantizer.

The residual geometry information inverse quantizer 30010 may inversely quantize the received residual geometry information. The residual geometry information inverse quantizer 30010 may generate residual geometry information by performing inverse quantization based on the quantization parameter and the received quantized residual geometry information.

The geometry information predictor 30020 may generate a predicted value of the geometry information in order to reconstruct the geometry information. The geometry information predictor 30020 may generate predicted geometry information based on the predicted geometry information generation related information provided by the geometry information entropy decoder and the previously decoded geometry information provided from the memory. The geometry information predictor may include an inter-predictor and an intra-predictor. The inter-predictor may use information required for inter-prediction of the current prediction unit provided by the encoding device to perform inter-prediction of the current prediction unit based on information included in at least one of a space before the current space including the current prediction unit or a space after the current space. The intra-predictor may generate predicted geometry information based on the geometry information about the points in the current space. In the case of intra-prediction in a prediction unit, intra-prediction may be performed based on intra-prediction mode information about the prediction unit provided by the encoding device. Reconstructed geometry information may be generated by adding the reconstructed residual geometry information to the predicted geometry information. The reconstructed geometry information may be provided to the filter.

The memory 30030 may store the reconstructed geometry information computed through the filter.

The coordinate inverse transformer 30040 may inversely transform the coordinates of the geometry information. The coordinate inverse transformer 30040 may perform coordinate inverse transformation based on the coordinate transform-related information provided from the geometry information entropy decoder and the reconstructed geometry information stored in the memory.

The filter 30050 may filter the geometry information. The filter 30050 may perform filtering based on the characteristic of the filtering-related information provided by the decoder or the reconstructed geometry information derived by the decoder.

FIG. 31 shows an attribute information decoder according to embodiments.

The attribute information decoder of FIG. 31 may be included in the point cloud video decoder 10006 of FIG. 1, the decoding 20002 of FIG. 2, the decoder of FIG. 10, the decoder of FIG. 11, the reception device of FIG. 13, the XR device 1430 of FIG. 14, the attribute information decoder 20050 of the PCC decoder of FIG. 20, and the like, and may correspond to the attribute information decoder of FIG. 22.

The PCC decoder may include a geometry information decoder and an attribute information decoder. The attribute information decoder may receive an encoded attribute information bitstream and restore attribute information by performing a process illustrated in the diagram.

The attribute information decoder may include an attribute information entropy decoder 31000, a geometry information mapper 31010, a residual attribute information inverse quantizer 31020, a residual attribute information inverse transformer 31030, an attribute information predictor 31040, a memory 31050, and an attribute information inverse transformer 31060.

The arithmetic decoder 13007 corresponds to the attribute information entropy decoder 31000 of the attribute information decoder, and the inverse quantization processor 13008 corresponds to the residual attribute information inverse quantizer 31020. The prediction/lifting/RAHT inverse transform processor 13009 is divided into the residual attribute information inverse transformer 31030 and the attribute information predictor 31040, and the color inverse transform processor 13010 corresponds to the attribute information inverse transformer 31060.

The attribute information entropy decoder 31000 may decode attribute information included in the attribute information bitstream based on the entropy scheme. The attribute information entropy decoder 31000 may entropy-decode the received attribute information bitstream to generate transformed and quantized attribute information. The generated transformed and quantized attribute information may be input to the geometry information mapper.

The geometry information mapper 31010 may map the reconstructed geometry information to the attribute information. The geometry information mapper 31010 map the transformed and quantized attribute information received from the attribute information entropy decoder to the received reconstructed geometry information. The attribute information mapped to the geometry information may be input to the residual attribute information inverse quantizer.

The residual attribute information inverse quantizer 31020 may inversely quantize the residual attribute information. The residual attribute information inverse quantizer 31020 may inversely quantize the received transformed and quantized attribute information based on a quantization value. The inversely quantized transformed residual attribute information may be input to the residual attribute information inverse transformer.

The residual attribute information inverse transformer 31030 may inversely transform the residual attribute information. The residual attribute information inverse transformer 31030 may inversely transform the 3D residual block including the received transformed residual attribute information using a transform type such as DCT, DST, DST, SADCT, or RAHT. The inversely transformed residual attribute information may be combined with the predicted attribute information generated by the attribute information predictor and stored in the memory. Alternatively, the residual attribute information may be combined with the predicted attribute information without performing inverse transformation, and be then stored in the memory.

The attribute information predictor 31040 may generate a predicted value of the attribute information in order to restore the attribute information. The attribute information predictor 31040 generates predicted attribute information based on the attribute information about the points in the memory 31050. The predicted information may be obtained by performing entropy decoding.

The attribute information inverse transformer 31060 may inversely transform the attribute information. The attribute information inverse transformer 31060 may receive attribute information type and transform information from the entropy decoder and perform various color space inverse transformations such as RGB-YUV and RGB-YUV.

Figure 32:
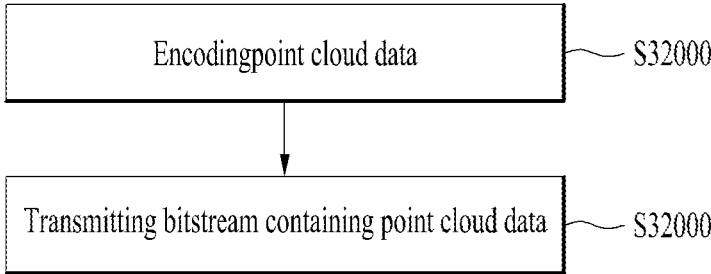
FIG. 32 illustrates a method of transmitting point cloud data according to embodiments.

FIG. 32 illustrates a method of transmitting point cloud data according to embodiments.

S32000: The method of transmitting point cloud data according to the embodiments may include encoding point cloud data. The encoding operation according to the embodiments may correspond to or be combined with the operations of the transmission device 10000 of FIG. 1, the point cloud video encoder 10002, the encoding 20001 of FIG. 2, the encoder of FIG. 4, the transmission device of FIG. 12, and the XR device 1430 of FIG. 14, the encoding process of FIG. 15, the PCC encoder of FIG. 20, the attribute information encoder of FIG. 21, the attribute information predictor of FIG. 23, the geometry information encoder of FIG. 28, the geometry information encoder of FIG. 29, and the like.

S32010: The method of transmitting point cloud data according to the embodiments may further include transmitting a bitstream including the point cloud data. The transmission operation according to the embodiments may correspond to or be combined with the operations of the transmission device 10000, the transmitter 10003 of FIG. 1, the transmission 20002 of FIG. 2, the transmission processor 12012 of the transmission device of FIG. 12, the XR device 1430 of FIG. 14, the transmission of the PCC encoder of FIG. 20, the bitstream transmission of FIGS. 24 to 27, and the like.

Figure 33:
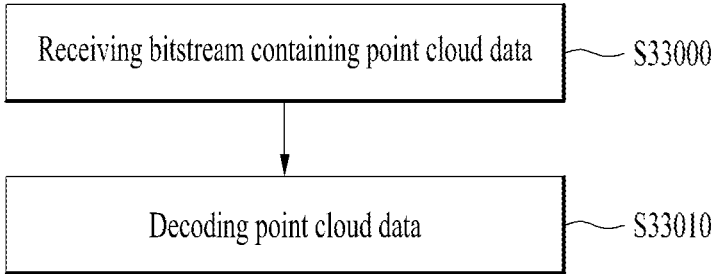
FIG. 33 illustrates a method of receiving point cloud data according to embodiments.

FIG. 33 illustrates a method of receiving point cloud data according to embodiments.

S33000: The method of receiving point cloud data according to the embodiments may include receiving a bitstream including point cloud data. The reception operation according to the embodiments may correspond to or be combined with the operations of the reception device 10004, the receiver 10007 of FIG. 1, the transmission 20002 of FIG. 2, the receiver 13000 and the reception processor 13001 of the reception device of FIG. 13, the XR device 1430 of FIG. 14, reception of the PCC decoder of FIG. 20, the bitstream reception of FIGS. 24 to 27, and the like.

S33010: The method of receiving point cloud data according to the embodiments may further include decoding the point cloud data. The decoding operation according to the embodiments may correspond to or be combined with the operations of the reception device 10004, the point cloud video decoder 10006 of FIG. 1, the decoding 20003 of FIG. 2, the decoder of FIG. 10, the decoder of FIG. 11, the reception device of FIG. 13, FIG. XR device 1430 of FIG. 14, the decoding process of FIG. 15, the PCC decoder of FIG. 20, the attribute information decoder of FIG. 22, the attribute information predictor of FIG. 23, the geometry information decoder of FIG. 30, the attribute information decoder of FIG. 31, and the like.

The embodiments provide a method of generating a neighbor point set based on similar attributes as a method to increase the attribute compression efficiency of the encoder (encoding device)/decoder (decoding device) of geometry-based point cloud compression (G-PCC) for 3D point cloud data compression.

Accordingly, the embodiments may provide a point cloud content stream providing a higher restoration rate by increasing the attribute compression efficiency of the encoder (encoding device)/decoder (decoding device) of G-PCC for 3D point cloud data compression.

According to embodiments, neighbor candidates may be selected based on similar attributes to generate a neighbor point set. In addition, whether to generate the neighbor point set based on distance or based on similar attributes may be signaled to the decoder according to a method applied to the encoder.

With the similar attribute-based neighbor point selection method according to the embodiments, the compression efficiency and the restoration rate may be increased by selecting points with the highest similarity as many as the maximum number of neighbor point sets.

The similar attribute-based neighbor point selection method according to the embodiments may provide an efficient coding scheme through a minimum attribute similarity threshold.

The PCC encoder or PCC decoder according to the embodiments may increase attribute compression efficiency by generating a neighbor point set and using signaling information therefor.

In the present disclosure, "A/B" may be interpreted as A and/or B.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "AB" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

MODE FOR DISCLOSURE

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that variously changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method comprising:
decoding geometry data of point cloud data in a bitstream; and
decoding attribute data of the point cloud data in the bitstream, wherein the decoding the attribute data includes:
predicting the attribute data based on a search range for a neighbor,
wherein the neighbor is selected based on a distance,
wherein the bitstream includes information related to the search range of points around a search center point, and information for a threshold which is used to predict the attributed data.

2. The method of claim 1,
wherein the decoding of the attribute data comprises:
generating a Level of Detail (LOD) based on the geometry data and the attribute data;
generating a neighbor point set for a point of the point cloud data based on a similar attribute;
selecting the neighbor in the neighbor point set; and
decoding information about the selected neighbor.

3. The method of claim 2, wherein the generating of the neighbor point set comprises:
configuring the search range for searching the neighbor point set based on a Morton code or an octree for the point cloud data.

4. The method of claim 3, wherein the selecting of the neighbor comprises:
selecting the neighbor based on a distance, a similar attribute, or both the distance and the similar attribute within the search range.

5. The method of claim 2, further comprising:
generating a predicted candidate list for the attribute data;
parsing an index of the predicted candidate list of the point cloud data; and
restoring an index difference value based on metadata included in the bitstream.

6. An apparatus comprising:
a memory; and
at least one processor connected to the memory, at least one processor configured to:
receive a bitstream containing point cloud data;
decode geometry data of the point cloud data; and
decode attribute data of the point cloud data
predict the attribute data based on a search range for a neighbor,
wherein the neighbor is selected based on a distance,
wherein the bitstream includes information related to the search range of points around a search center point, and information for a threshold which is used to predict the attributed data.

7. The apparatus of claim 6,
wherein the at least one processor is further configured to:
generate a Level of Detail (LOD) based on the geometry data and the attribute data;
generate a neighbor point set for points of the point cloud data based on similar attributes;
select the neighbor in the neighbor point set; and
decode information about the selected neighbor.

8. The apparatus of claim 7, wherein the at least one processor is further configured to:
configure the search range for searching the neighbor point set based on a Morton code or an octree for the point cloud data.

9. The apparatus of claim 8, wherein the at least one processor is further configured to:
select the neighbor based on a distance, a similar attribute, or both the distance and the similar attribute within the search range.

10. The apparatus of claim 7, wherein the at least one processor is further configured to:
generate a predicted candidate list for the attribute data;
parse an index of the predicted candidate list of the point cloud data; and
restore an index difference value based on metadata included in the bitstream.

11. A method comprising:
encoding geometry data of point cloud data in a bitstream;
encoding attribute data of the point cloud data in the bitstream, wherein the encoding the attribute data includes:
predicting the attribute data based on a search range for a neighbor,
wherein the neighbor is selected based on a distance;
wherein the bitstream includes information related to the search range of points around a search center point, and information for a threshold which is used to predict the attributed data.

12. The method of claim 11,
wherein the encoding of the attribute data comprises:
generating a Level of Detail (LOD) based on the geometry data and the attribute data;
generating a neighbor point set for points of the point cloud data based on a similar attribute;
selecting the neighbor in the neighbor point set; and
encoding information about the selected neighbor.

13. The method of claim 12, wherein the generating of the neighbor point set comprises:

configuring the search range for searching the neighbor point set based on a Morton code or an octree for the point cloud data.

14. The method of claim 13, wherein the selecting of the neighbor comprises:

selecting the neighbor based on a distance, a similar attribute, or both the distance and the similar attribute within the search range.

15. The method of claim 12, further comprising:

generating a predicted candidate list for the attribute data;

selecting a neighbor candidate in the predicted candidate list based on rate-distortion optimization (RDO);

encoding an index difference for the neighbor candidate; and transmitting metadata about the index difference.

16. An apparatus comprising:

a memory; and at least one processor connected to the memory, at least one processor configured to:

encode geometry data of point cloud data;

encode attribute data of the point cloud data predict the attribute data based on a search range for a neighbor, wherein the neighbor is selected based on a distance; and transmit a bitstream containing the point cloud data, wherein the bitstream includes information related to the search range of points around a search center point, and information for a threshold which is used to predict the attributed data.

17. The apparatus of claim 16, wherein the at least one processor is further configured to:

generate a Level of Detail (LOD) based on the geometry data and the attribute data;

generate a neighbor point set for points of the point cloud data based on a similar attribute;

select the neighbor in the neighbor point set; and encode information about the selected neighbor.

18. The apparatus of claim 17, wherein the at least one processor is further configured to:

configure the search range for searching the neighbor point set based on a Morton code or an octree for the point cloud data.

19. The apparatus of claim 18, wherein the at least one processor is further configured to:

select the neighbor based on a distance, a similar attribute, or both the distance and the similar attribute within the search range.

20. The apparatus of claim 17, wherein the at least one processor is further configured to:

generate a predicted candidate list for the attribute data;

select a neighbor candidate in the predicted candidate list based on rate-distortion optimization (RDO);

encode an index difference for the neighbor candidate; and transmit metadata about the index difference.

* * * * *